US010955236B2

(12) United States Patent
Wolke

(10) Patent No.: US 10,955,236 B2
(45) Date of Patent: Mar. 23, 2021

(54) THREE-DIMENSIONAL MEASURING SYSTEM

(71) Applicant: FARO Technologies, Inc., Lake Mary, FL (US)

(72) Inventor: Matthias Wolke, Korntal-Münchingen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 16/376,521

(22) Filed: Apr. 5, 2019

(65) Prior Publication Data

US 2020/0318954 A1 Oct. 8, 2020

(51) Int. Cl.
*G01B 11/25* (2006.01)
*G02B 26/10* (2006.01)
*G01B 21/04* (2006.01)

(52) U.S. Cl.
CPC .......... *G01B 11/2518* (2013.01); *G01B 21/04* (2013.01); *G02B 26/10* (2013.01)

(58) Field of Classification Search
CPC ................................................. G01B 11/2518
USPC ........................................................ 356/620
See application file for complete search history.

(56) References Cited

U.S. PATENT DOCUMENTS

| 4,396,945 | A | * | 8/1983 | DiMatteo | B25J 19/023 348/139 |
| 4,709,580 | A | * | 12/1987 | Butts, Jr. | G01S 7/481 244/171 |
| 4,803,645 | A | * | 2/1989 | Ohtomo | G01C 11/06 356/2 |
| 5,267,143 | A | * | 11/1993 | Pryor | B25J 9/1697 348/95 |
| 5,506,682 | A | * | 4/1996 | Pryor | A01B 69/008 356/400 |
| 5,670,787 | A | | 9/1997 | Pryor et al. | |
| 5,734,172 | A | | 3/1998 | Pryor et al. | |
| 5,757,674 | A | * | 5/1998 | Marugame | G02B 7/28 359/204.1 |
| 5,880,459 | A | | 3/1999 | Pryor et al. | |
| 5,940,302 | A | | 8/1999 | Pryor | |
| 5,973,788 | A | * | 10/1999 | Pettersen | G01C 15/00 356/614 |
| 6,138,055 | A | | 10/2000 | Pryor | |
| 6,211,506 | B1 | | 4/2001 | Pryor et al. | |
| 6,389,158 | B1 | * | 5/2002 | Pettersen | G01B 11/002 382/154 |
| 6,466,305 | B1 | | 10/2002 | McBain | |
| 6,466,325 | B1 | * | 10/2002 | Gooch | G01B 11/002 356/601 |

(Continued)

FOREIGN PATENT DOCUMENTS

EP 3156761 A1 4/2017

OTHER PUBLICATIONS

European Search Report for Application No. EP20164438 dated Sep. 3, 2020; 9 pgs.

*Primary Examiner* — Roy M Punnoose
(74) *Attorney, Agent, or Firm* — Cantor Colburn LLP

(57) ABSTRACT

A system includes a polarization target having two or more surfaces, a polarization camera that captures an image of the polarization target and records polarization of light that formed the image, and a processor that determines an orientation of the polarization target based at least in part on the captured image and the determined polarization.

17 Claims, 26 Drawing Sheets

(56) References Cited

U.S. PATENT DOCUMENTS

| | | | |
|---|---|---|---|
| 6,484,381 B2* | 11/2002 | Cunningham | G01B 11/002 |
| | | | 29/407.04 |
| 6,503,195 B1 | 1/2003 | Keller et al. | |
| 6,617,601 B1 | 9/2003 | Wiklund | |
| 6,618,155 B2 | 9/2003 | Metcalfe et al. | |
| 6,678,057 B2 | 1/2004 | Harding et al. | |
| 6,711,293 B1 | 3/2004 | Lowe | |
| 6,825,936 B2 | 11/2004 | Metcalfe et al. | |
| 7,414,732 B2* | 8/2008 | Maidhof | G01B 11/005 |
| | | | 250/559.22 |
| 7,525,114 B2 | 4/2009 | Metcalfe et al. | |
| 8,379,224 B1* | 2/2013 | Piasse | G01B 11/002 |
| | | | 356/601 |
| 8,502,991 B2* | 8/2013 | Daxauer | G01B 11/002 |
| | | | 356/620 |
| 9,448,059 B2* | 9/2016 | Bridges | G01S 17/003 |
| 9,562,764 B2* | 2/2017 | France | G01B 11/26 |
| 9,747,698 B2* | 8/2017 | Stathis | G06T 19/00 |
| 9,964,398 B2* | 5/2018 | Becker | G01B 11/005 |
| 10,507,063 B2* | 12/2019 | Zuhars | A61B 34/20 |
| 10,573,010 B2* | 2/2020 | Held | G01P 15/165 |
| 2008/0123110 A1* | 5/2008 | Dickinson | G01B 11/03 |
| | | | 356/620 |
| 2008/0304081 A1 | 12/2008 | Debevec et al. | |
| 2011/0298916 A1 | 12/2011 | Arden | |
| 2014/0022539 A1* | 1/2014 | France | G01S 19/48 |
| | | | 356/139.1 |
| 2016/0163752 A1* | 6/2016 | Sambongi | H04N 9/045 |
| | | | 348/222.1 |
| 2016/0171712 A1 | 6/2016 | Arden | |
| 2016/0291160 A1 | 10/2016 | Zweigle et al. | |
| 2017/0245945 A1* | 8/2017 | Zuhars | A61B 90/39 |
| 2017/0343338 A1 | 11/2017 | Hamaguchi et al. | |
| 2018/0018778 A1 | 1/2018 | Haverkamp et al. | |
| 2018/0100731 A1* | 4/2018 | Pau | G02B 27/286 |
| 2018/0204882 A1* | 7/2018 | Segawa | G01J 4/04 |
| 2018/0224270 A1* | 8/2018 | Wolke | G01S 17/66 |
| 2019/0295286 A1* | 9/2019 | Ishida | G06T 7/536 |
| 2020/0050833 A1* | 2/2020 | Ogasawara | G06T 7/00 |

* cited by examiner

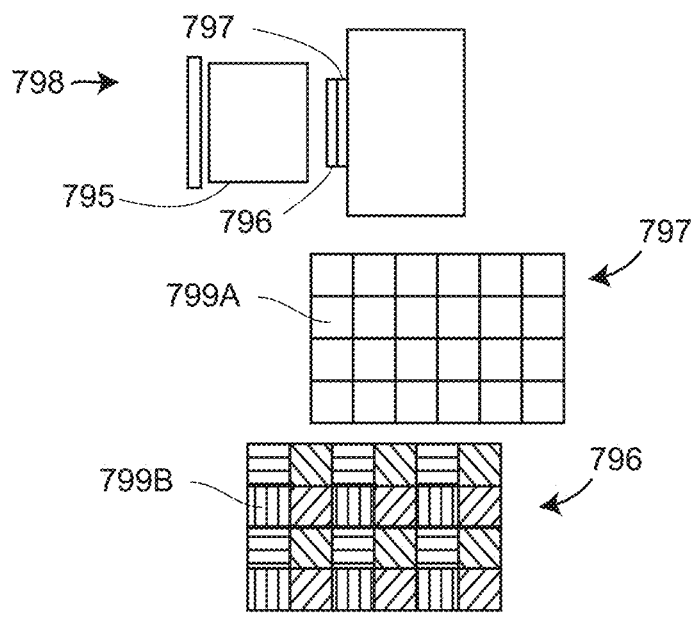
FIG. 7A
FIG. 7B
FIG. 7C
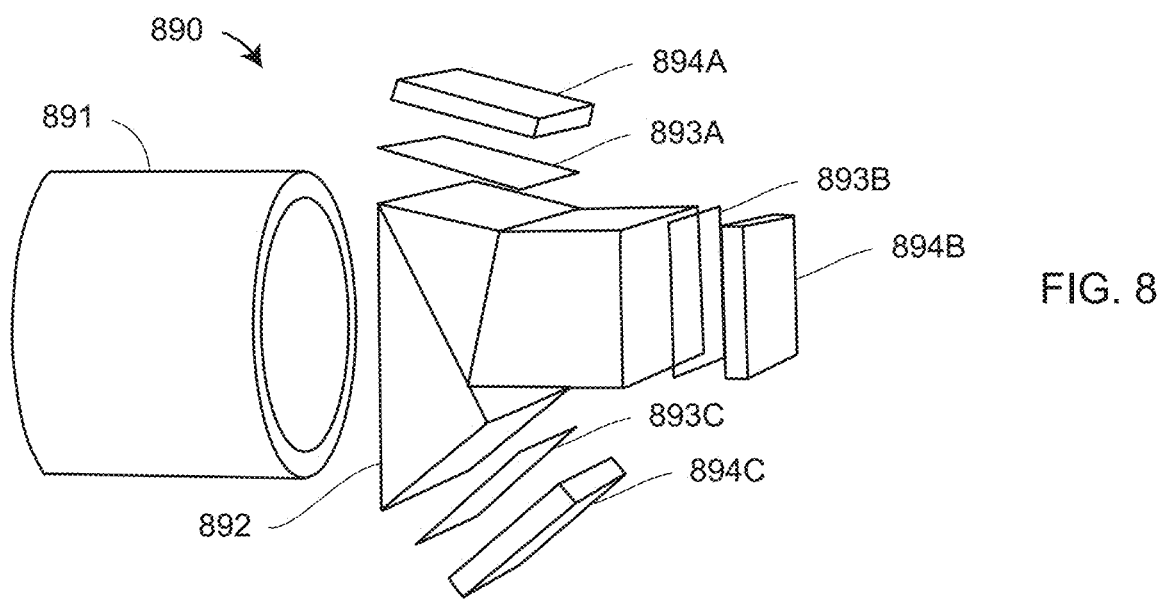
FIG. 8

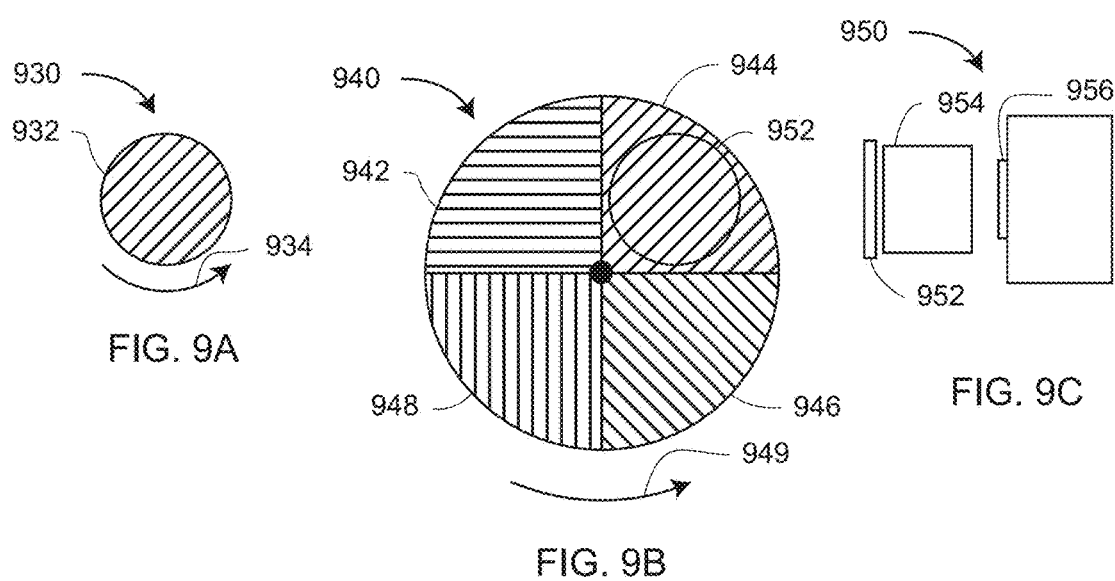
FIG. 9A
FIG. 9B
FIG. 9C
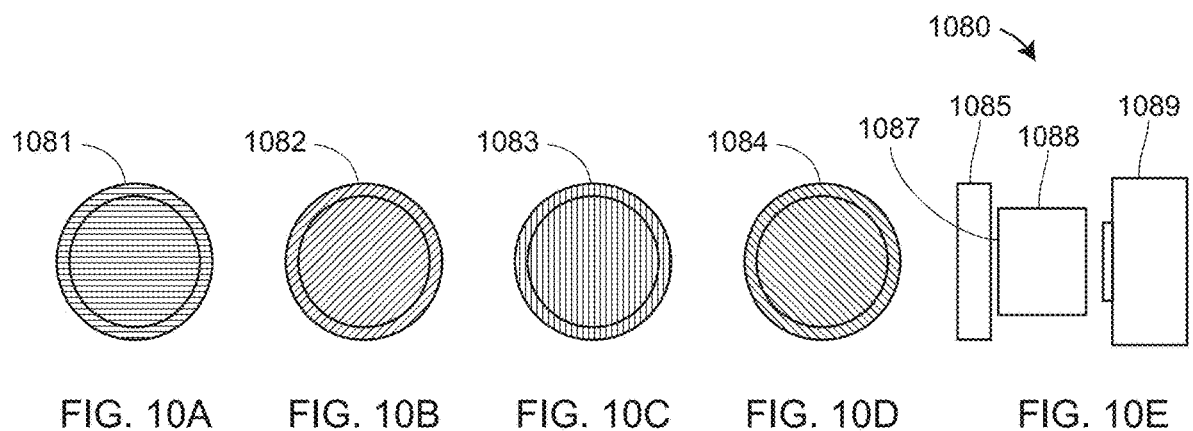
FIG. 10A   FIG. 10B   FIG. 10C   FIG. 10D   FIG. 10E

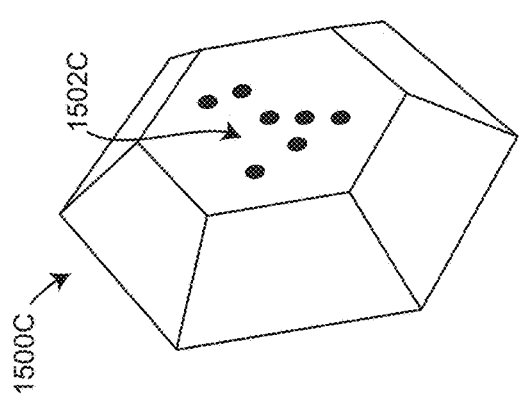
FIG. 15C
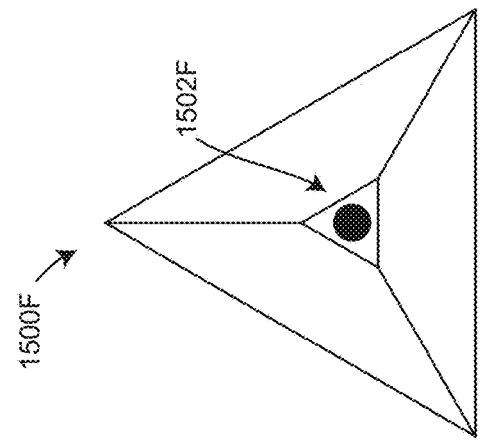
FIG. 15F
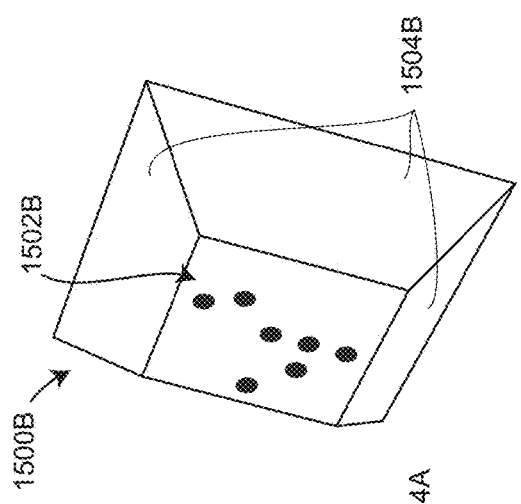
FIG. 15B
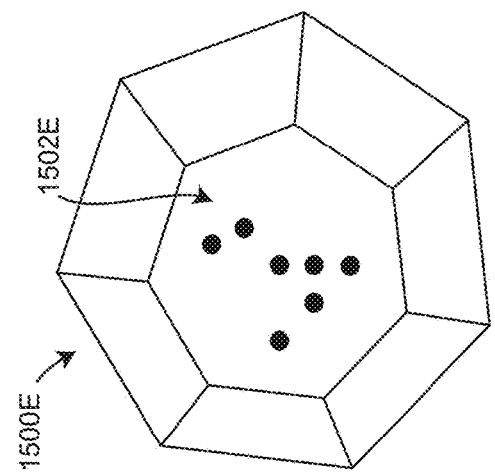
FIG. 15E
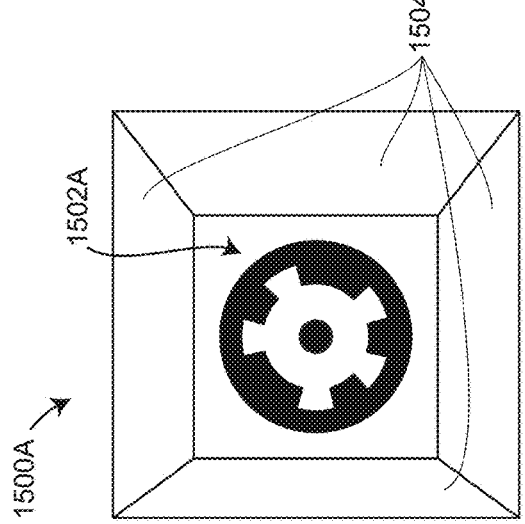
FIG. 15A
FIG. 15D

THREE-DIMENSIONAL MEASURING SYSTEM

FIELD OF THE INVENTION

The subject matter disclosed herein relates to registration of three-dimensional (3D) data points obtained using triangulation scanners.

BACKGROUND

A triangulation scanner, also referred to as a 3D imager, uses a triangulation method to measure the 3D coordinates of points on an object. The triangulation scanner usually includes a projector that projects onto a surface of the object either a pattern of light in a line or a pattern of light covering an area. At least one camera and the projector are coupled together in a fixed relationship. For example, the projector and the one or more cameras may be attached to a common frame. The light emitted from the projector is reflected off the object surface and detected by the camera(s). Since the camera(s) and projector are arranged in a fixed relationship, the distance to the object may be determined using trigonometric principles. Compared to coordinate measurement devices that use tactile probes, triangulation systems provide advantages in quickly acquiring coordinate data over a large area. As used herein, the resulting collection of 3D coordinate values or data points of the object being measured by the triangulation scanner is referred to as point cloud data or simply a point cloud.

A challenge often faced in measuring relatively large objects with triangulation scanners is registering multiple sets of 3D points obtained with the triangulation scanner, the multiple sets being obtained by moving the scanner in relation to the object being measured. One method for performing such a registration is to place markers on or near the object under test. These markers are measured by a wide field-of-view (FOV) camera affixed to the triangulation scanner so that common markers are seen in captured images. A difficulty with this approach is that, to get good registration, it is usually necessary to use a large number of markers, with some of the markers located off a common plane. In practice, an adequate arrangement of markers is often not achieved or achieved only with great effort.

There is a need for an improved method of registration in which good registration is achieved with a single registration target or a small number of registration targets. Accordingly, while existing registration markers and existing methods of registering markers are suitable for their intended purpose, the need for improvement remains.

BRIEF DESCRIPTION OF THE INVENTION

According to an embodiment, a system includes: a polarization target having three or more surfaces; a polarization camera operable to capture an image of the polarization target and to record polarization of light that formed the image; and a processor operable to determine an orientation of the polarization target based at least in part on the captured image and the determined polarization.

In this or one or more other embodiments, the polarization target includes a dielectric material. In this or one or more other embodiments, the polarization target includes a nonmetallic material. In this or one or more other embodiments, the polarization target includes a marker. In this or one or more other embodiments, the processor is operable to further determine a transverse position of the polarization target based at least in part on an image of the marker captured by the first polarization camera.

In this or one or more other embodiments, the processor is operable to further determine a transverse position of the polarization target based at least in part on a plurality of edge segments captured by the first polarization camera. In this or one or more other embodiments, the polarization target further includes a second marker. In this or one or more other embodiments, the processor is operable to determine the orientation of the polarization target further based on a geometrical representation of the polarization target. In this or one or more other embodiments, the system further comprises a noncontact three-dimensional (3D) measuring device operable to measure 3D coordinates of an object.

In this or one or more other embodiments, the noncontact 3D measuring device is a triangulation scanner having a projector and a scanner camera, the triangulation scanner operable to measure three-dimensional (3D) coordinates of the object. In this or one or more other embodiments, the processor is further operable to register 3D coordinates obtained by the triangulation scanner in a first scan and a second scan based at least in part on a first image and a second image of the polarization target obtained by the first polarization camera.

In this or one or more other embodiments, the processor is further operable to determine a normal vector of a surface of the polarization target, the normal vector based at least in part on a determined polarization of light that formed an image of the surface. In this or one or more other embodiments, the processor is further operable to determine the normal vector of the surface of the polarization target based at least in part on a determined angle of polarization of the surface of the polarization target. In this or one or more other embodiments, the processor is further operable to determine a normal vector of a plurality of surfaces of the polarization target. In this or one or more other embodiments, the processor is further operable to determine the orientation of the polarization target based on an optimization program to minimize residual errors in the orientation.

In this or one or more other embodiments, the system further includes a second polarization target. In this or one or more other embodiments, the polarization target is coupled to the triangulation scanner. In this or one or more other embodiments, the system further comprises a second polarization target coupled to the triangulation scanner. In this or one or more other embodiments, the system further comprises a second polarization camera, the first polarization camera and the second polarization camera being part of a stereo polarization camera.

According to a further embodiment, a method includes: in a first instance, measuring first three-dimensional (3D) coordinates of an object with a noncontact 3D measuring device; in the first instance, with a polarization camera, capturing an image of a polarization target and recording polarization of light that formed the image; in a second instance, measuring second 3D coordinates of an object with the noncontact 3D measuring device; in the second instance, with the polarization camera, capturing an image of the polarization target and recording polarization of light that formed the image; with a processor, determining a position of the polarization target based at least in part on the captured image in the first instance, the captured image in the second instance, the recorded polarization in the first instance, and the recorded polarization in the second instance; with the processor, registering the first 3D coordinates and the second 3D coordinates in a common coordinate system to obtain registered 3D coordinates, the registering based at least in part on the first 3D coordinates, the second 3D coordinates, and the position of the polarization target; and storing the registered 3D coordinates.

In this or one or more other embodiments, the noncontact 3D measuring device is a triangulation scanner. In this or one or more other embodiments, the method further comprises: in the first instance, capturing with the polarization camera a first image of a marker on the polarization target; in the second instance, capturing with the polarization camera a second image of the marker on the polarization target; and with the processor, registering the first 3D coordinates and the second 3D coordinates in the common coordinate system, the registering further based on the first image of the marker and on the second image of the marker.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the end of the specification. The foregoing and other features and advantages of the invention are apparent from the following detailed description taken in conjunction with the accompanying drawings in which:

FIGS. 7A, 7B, 7C are schematic representations of camera components, photosensitive array pixels, and polarization-mask elements, respectively, according to an embodiment;

FIG. 8 is a perspective view of a camera that includes a prismatic element that sends different polarizations to separate photosensitive arrays according to an embodiment;

FIGS. 9A, 9B, 9C are schematic representations of a rotating linear polarizer, a rotation element that includes four linear polarizers oriented are different angles, and camera elements, respectively;

FIGS. 10A, 10B, 10C, 10D are schematic representations of different polarization states obtained by an electro-optic assembly according to an embodiment;

FIG. 10E is a schematic representation of camera elements for use with an electro-optic assembly as described in FIGS. 10A, 10B, 10C, 10D according to an embodiment;

FIGS. 15A, 15B, 15C, 15D, 15E, 15F are front or perspective views of polarization targets according to an embodiment;

The detailed description explains embodiments of the invention, together with advantages and features, by way of example with reference to the drawings.

DETAILED DESCRIPTION

Embodiments of the present invention provide advantages in reducing the number of registration targets required to obtain good registration in combining point cloud data obtained from triangulation scanners. In addition, embodiments of the present invention provide advantages in allowing more flexibility in the placement of registration markers.

Figure 1:
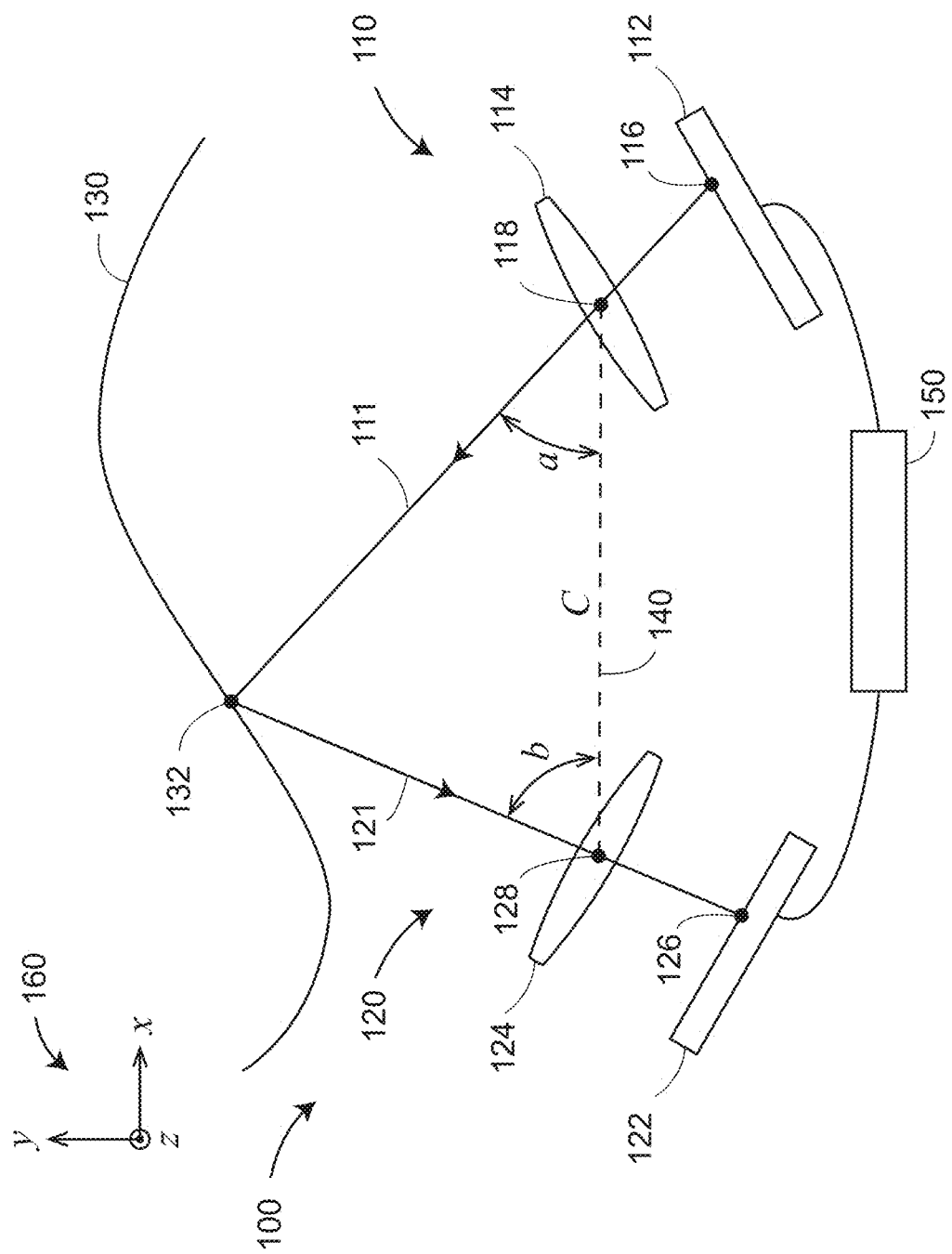
FIG. 1 is a schematic view of a triangulation scanner having one camera and one projector according to an embodiment.

FIG. 1 is a schematic representation of a triangulation scanner 100 having a projector 110, a camera 120, and a processor 150. In an embodiment, the projector 110 includes a projection component 112 and a lens 114. The projection component 112 generates a pattern of light that includes an illuminated point 116 that is projected through a perspective center 118 of the lens 114 in a ray of light 111 that creates a spot of light 132 on an object 130. The camera 120 includes a photosensitive array 122 and a lens 124. A ray of light 121 emerges from the spot of light 132 and passes through a perspective center 128 of the lens 124 before striking the photosensitive array 122 at a point 126. A processor 150 determines the 3D coordinates of the spot of light 132 in a frame of reference 160 of the scanner 100.

In an embodiment, the distance from the camera perspective center 128 to the point or spot of light 132 on the object is found by a triangulation calculation using a triangle formed by the points or spots of light 118, 132, and 128. The distance between the points 118 and 128 is the baseline distance 140, referred to as the baseline distance C. The baseline distance 140 is determined in a compensation procedure carried out for the scanner at an earlier time. The angle b for the point or spot of light 132 relative to the camera 100 is found from the pixel illuminated by the light ray 121. The angle a for the point or spot of light 132 relative to the projector 110 is found from the corresponding illuminated point 116 projected through the ray of light 111. With the angles a, b and the distance C known, the processor 150 can use trigonometry to determine every length and every angle of the triangle having points or spots of light 118, 132, 128.

To perform the triangulation calculation, a correspondence between the point 116 and the point 126 may be determined. In other words, a way may be determined that the illuminated point 116, and not an adjacent illuminated point, is the one that illuminated the point 126. There are several ways to determine such a correspondence. In one embodiment a distinctive pattern elements is formed on the projection component 112 that are recognizable on the photosensitive array 122. In another embodiment, a more accurate method involves forming a pattern that varies sinusoidally in irradiance on the surface of the projection component 112. By shifting the sinusoidal pattern laterally at least three times on the projection component, the processor 150 may use mathematics to extract a correspondence among pixels directly. In many cases, points are measured for a plurality of spatial periods of the sinusoidal pattern to determine the correspondence between the points 116 and the point 126. In other embodiments, other methods are used to determine a correspondence among projected and imaged points.

Figure 2:
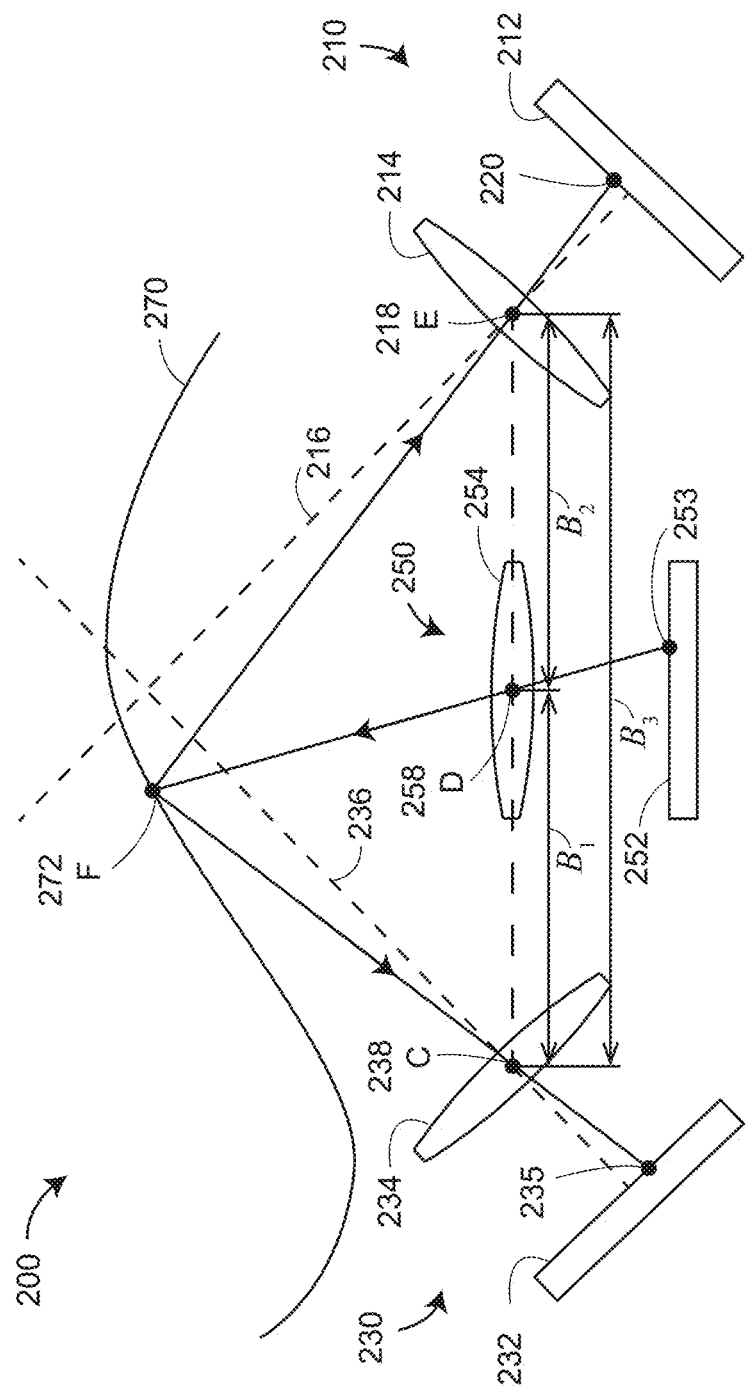
FIG. 2 is a schematic representation of a triangulation scanner having two cameras and a projector according to an embodiment.

FIG. 2 shows an embodiment of a triangulation scanner 200 that includes a projector 250, a first camera 210, a second camera 230, and a processor (not shown). The projector includes a projection component 252 and a lens 254. The projection component 252 generates a pattern of light that includes an illuminated point 253 that is projected through a perspective center 258 (point D) of the lens 254 in a ray of light that strikes an object 270 at a point 272 (point F). The first camera 210 includes a photosensitive array 212 and a lens 214. The optical axis of the first camera 210 is indicated by the line 216. A ray of light emerges from the spot or point 272 and passes through a perspective center 218 (point E) of the lens 214 before striking the photosensitive array 212 at the point 220. The second camera 230 includes a photosensitive array 232 and a lens 234. The optical axis of the second camera 230 is indicated by the line 236. A ray of light emerges from the spot or point 272 and passes through a perspective center 238 (point C) before striking the photosensitive array 232 at the point 235. Three baseline distances are present in the triangulation scanner 200: $B_1$, $B_2$, and $B_3$. These three baseline distances correspond to the three triangles C-D-F, D-E-F, and C-E-F. In an embodiment, all three triangles are used in performing calculations. In other embodiments, the triangle C-E-F that uses the baseline $B_3$ between the camera perspective centers 218 and 238 is found to give more accurate results than the other triangles and is used. A potential advantage of a triangulation scanner that includes two cameras as well as a projector is that a single camera may be able to see (i.e. within a field of view) in a region not visible to the both cameras. In this case, the projector and the single camera may be used to determine 3D coordinates of a region otherwise not available for measurement.

Figure 3:
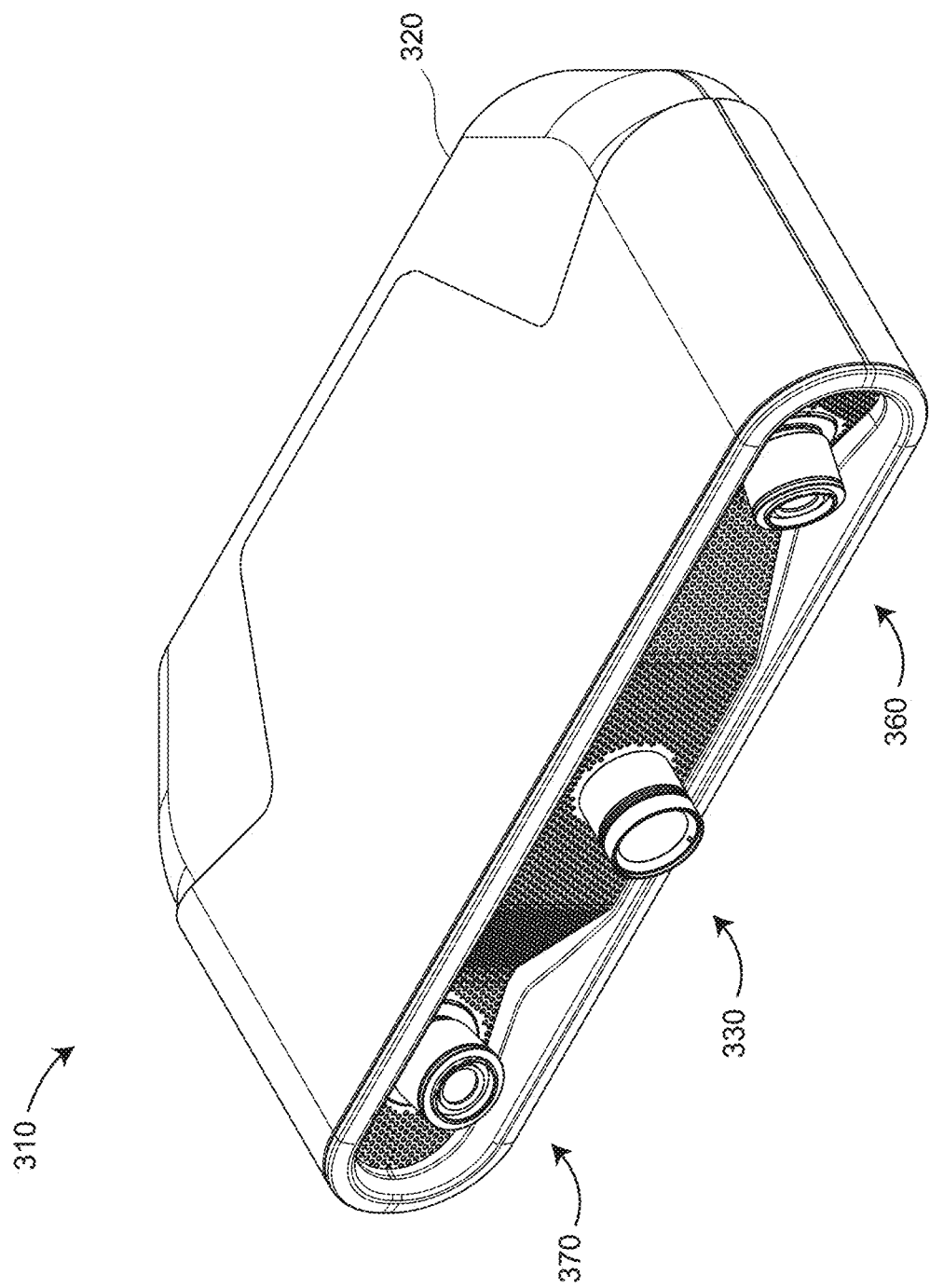
FIG. 3 is an isometric view of an area triangulation scanner according to an embodiment.

FIG. 3 is a perspective view of an area triangulation scanner 310 according to an embodiment. The area triangulation scanner 310 includes a frame 320, a projector 330, a first camera assembly 360, and a second camera assembly 370.

Figure 4:
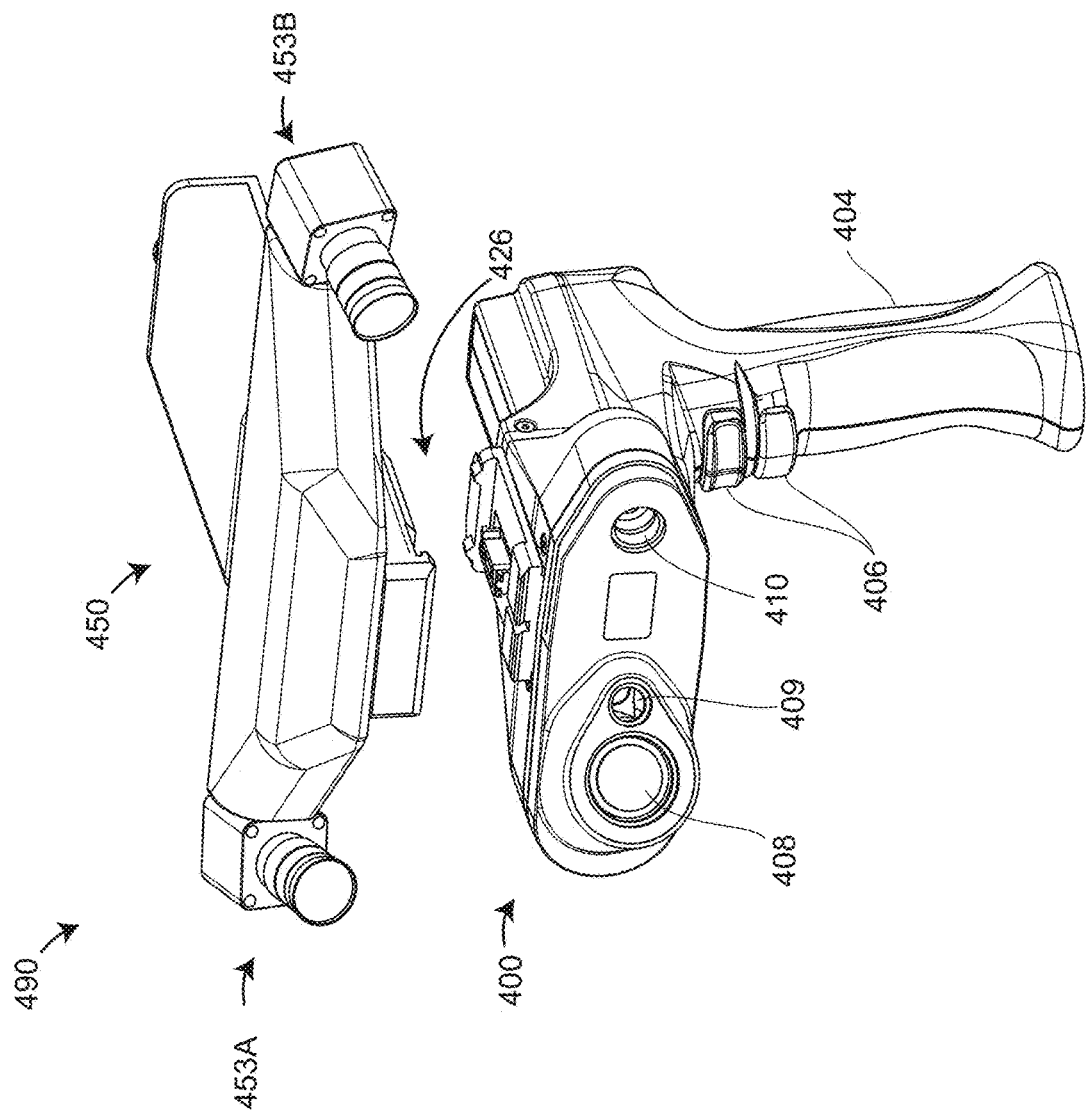
FIG. 4 is a perspective view, partly exploded, of a line scanner and a stereo registration camera according to an embodiment.

FIG. 4 is a perspective view, partly exploded, of a handheld measuring device 490 having a triangulation line scanner 400 (sometimes called a laser line probe) and a registration camera 450. In an embodiment, the triangulation line scanner 400 and the registration camera 450 interconnect mechanically and electrically through a connector assembly 426. In an embodiment, the triangulation line scanner 400 may also be configured for use with another instrument such as an articulated arm coordinate measurement machine through the connector assembly 426. In other embodiments, the triangulation line scanner 400 and the registration camera 450 are not connected by a connector assembly 426 but form a unitary structure.

In an embodiment, the triangulation line scanner 400 includes a projector 410, a camera 408, and distance indicator 409, a handle 404, and actuator buttons 406. In an embodiment, the projector 410 projects a line that is approximately perpendicular to the line connecting the perspective centers of the projector 410 and the camera 408. In this case, if the line connecting the perspective centers of the projector 410 and the camera 408 is horizontal, the projected line is vertical. The camera 408 includes a two-dimensional (2D) photosensitive array. In an embodiment, the camera is tilted to satisfy the Scheimpflug principle as a way of correcting perspective distortion in the received image. In an embodiment, the pattern of the light reflected onto the 2D photosensitive array of the camera 408 indicates the 3D coordinates of the object under test. In an embodiment, one axis of the photosensitive array indicates distance to object points, while the other axis of the photosensitive array indicates angle to corresponding object points.

In an embodiment, the registration camera 450 is used to locate registration markers, which may be placed on the object under test or outside the object under test. In another embodiment, the registration camera 450 identifies natural target points associated with the object rather than registration markers. Such target points are sometimes referred to as interest points and may include feature points such as those obtained from corner detection or from feature description, for example, by using scale-invariant feature transform (SIFT) described in U.S. Pat. No. 6,711,293, the contents of which are incorporated herein by reference. In an embodiment, the registration camera includes a first camera 453A and a second camera 453B. In an embodiment, when markers are used, the markers are placed on a frame used to fixture the object under test. In other embodiments, the markers are placed at other locations in the environment. In an embodiment, the cameras have a wide FOV capable of capturing many common markers in the multiple sets of 3D coordinates obtained by the triangulation line scanner 400. In another embodiment, the registration camera 450 includes only one camera such as the first camera 453A, rather than two cameras.

Figure 5A:
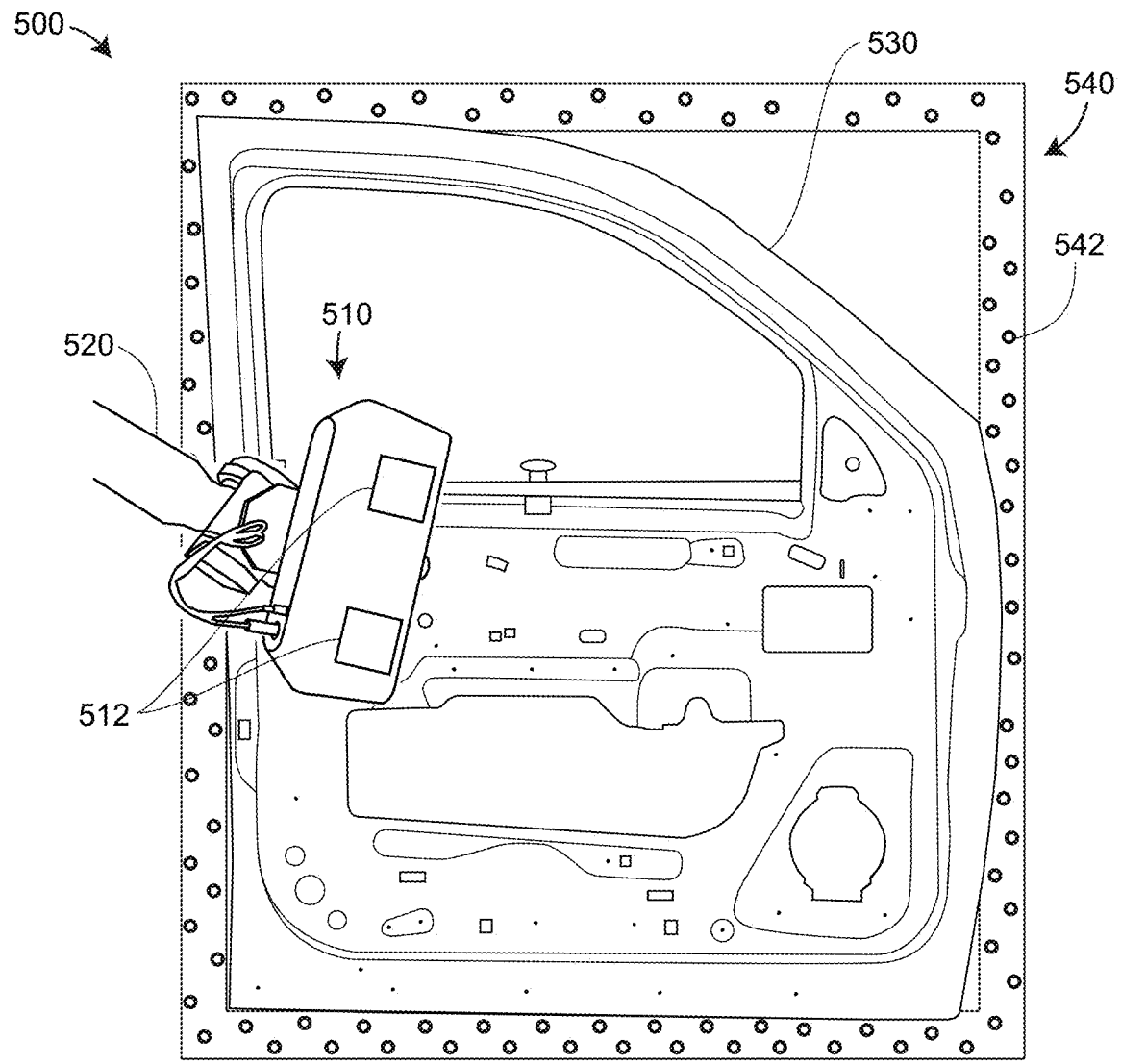
FIG. 5A is a front view of a triangulation scanner mounted on a robot to measure a car door affixed to a marked fixture according to an embodiment.

In an embodiment illustrated in FIG. 5A, a system 500 includes a noncontact 3D measuring device 510, an object 530, and a fixture 540 that holds the object 530. In an embodiment, noncontact 3D measuring device 510 is a triangulation scanner such as the area triangulation scanner 310. In an embodiment, the area triangulation scanner 310, which is attached to a robot 520, includes one or more wide field-of-view (FOV) cameras 512. In an embodiment, the fixture 540 includes registration markers 542 that are measured by the one or more cameras 512. In the example shown in FIG. 5A, the object 530 is a car door. In a 3D measurement method illustrated in FIG. 5A, the wide FOV camera(s) 512 provide a way to register the multiple widely spaced registration markers 542 into a common frame of reference, thereby enabling a plurality of 3D scan measurements, each covering a smaller FOV, to be stitched together to provide a single registered 3D image. In other words, in this example, 2D images obtained by the registration cameras 512 may enable measured 3D points of the object 530 to be registered into a common frame of reference.

Figure 5B:
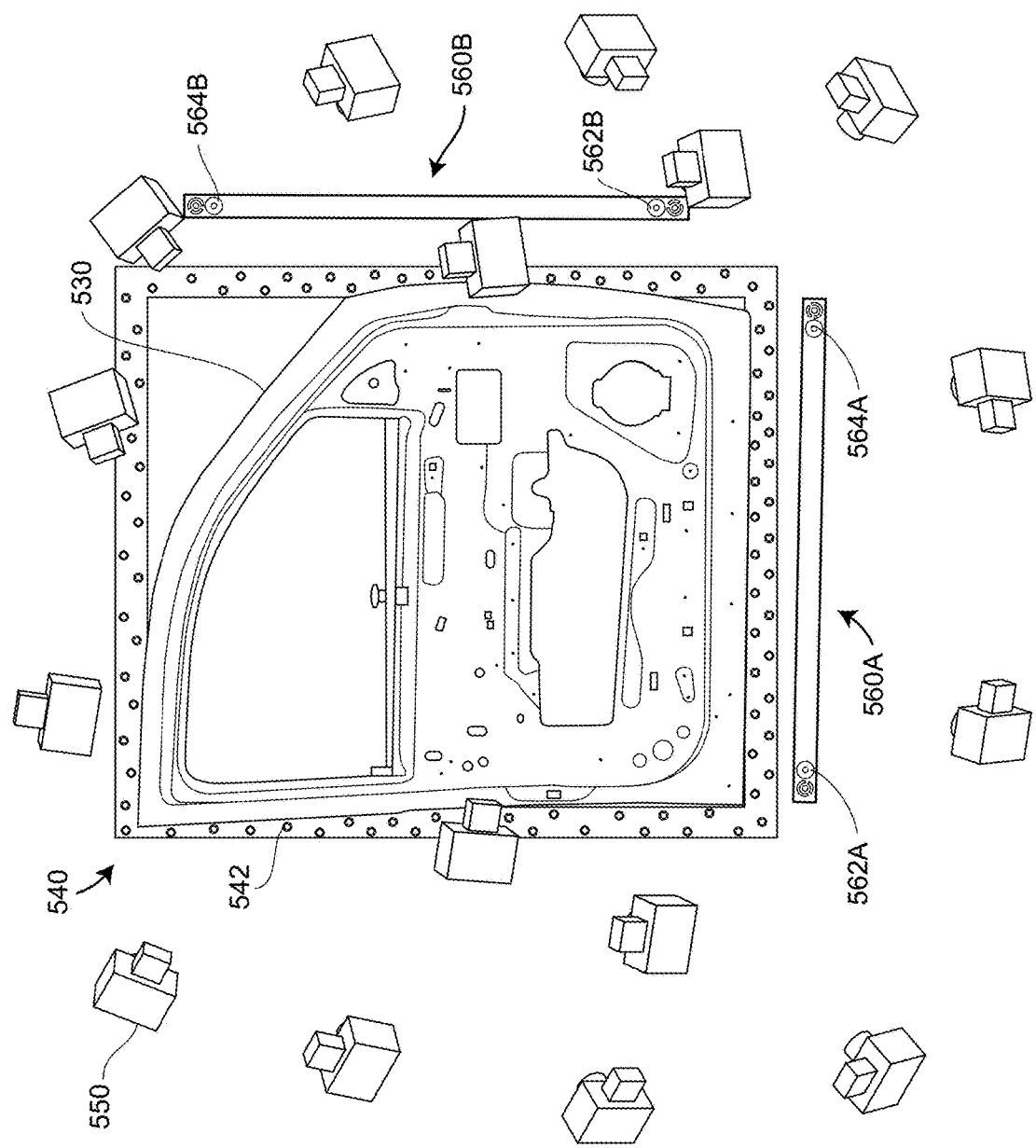
FIG. 5B is a front view of a photogrammetry camera moved to a multiplicity of poses to measure three-dimensional coordinates of a car door affixed to a marked fixture, the fixture proximate to scale bars according to an embodiment.

FIG. 5B shows an example in which images obtained by a photogrammetry camera 550 in a multiplicity of poses (suggested by the 16 camera poses of FIG. 5B) are used by a processor to register the multiple registration markers 542 into a single large 3D image. In an embodiment, one or more scale bars 560A, 560B are imaged by the photogrammetry camera 550. Calibrated reference distances are known between reference nests 562A, 564A for scale bar 560A and between reference nests 562B, 564B for scale bar 560B. A processor uses the measured reference distances of the scale bars 560A, 560B to provide a length scale for the registration markers 542 registered in the single large 3D image. In an embodiment, the photogrammetry camera further extracts 3D coordinates of features of the object 530. In another embodiment, a noncontact 3D measuring device such as the measuring device 510 is used to determine 3D coordinates of features of the object 530, while a single 3D image obtained by the photogrammetry camera 600 in the multiplicity of poses covers a relatively large volume. This single 3D image is used to assist in registering the 3D coordinates of the object features obtained by the noncontact 3D measuring device 510.

In some cases, the approaches described in FIGS. 5A, 5B result in errors in registering the multiple 3D images of the object 530. One cause of such errors is the placement of the registration markers 542 to be nearly coplanar, as illustrated in the embodiments of FIGS. 5A, 5B. Such errors in registration may also result when there are not enough markers present, especially in relation to the overlapping FOVs of the noncontact 3D measuring device.

Figure 6A:
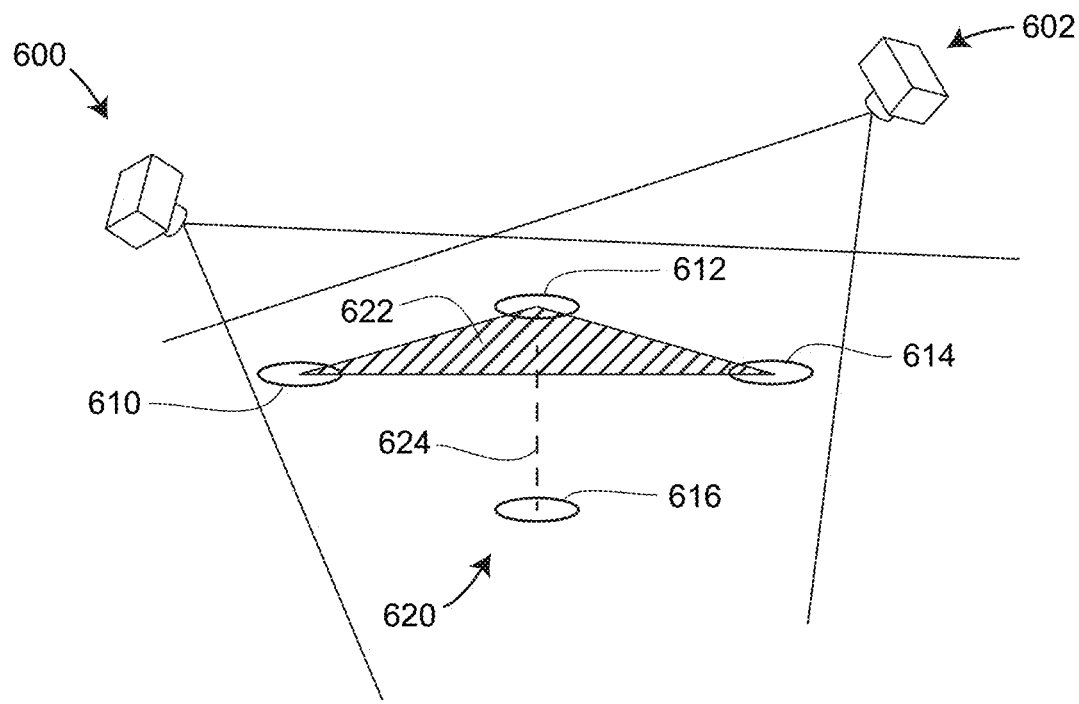
FIGS. 6A, 6B are schematic illustrations of the effect of varying depth in the spacing of markers according to an embodiment.
Figure 6B:
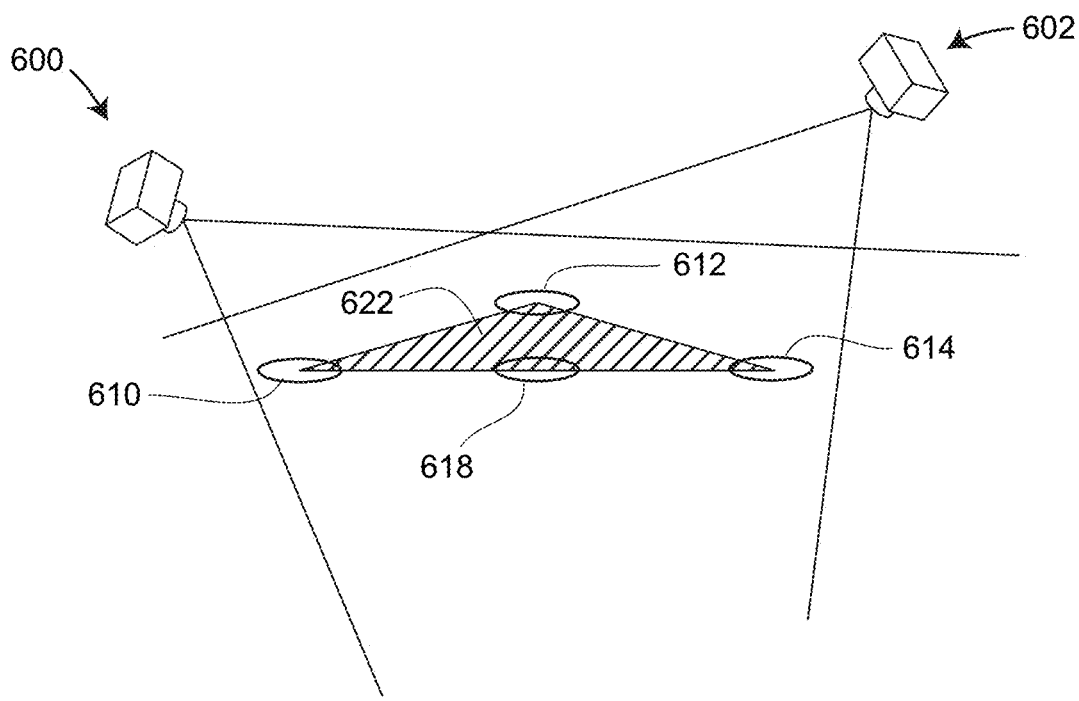

The placement of markers in FIGS. 6A, 6B illustrate the effect of varying the depth of registration markers when viewed by a camera in a first pose 600 at a first time and by the same camera in a second pose 602 at a second time. The term "pose" here means the six degrees of freedom of the camera. The six degrees of freedom may include three translational degrees of freedom (e.g., x, y, z) and three orientational degrees of freedom (e.g., roll angle, pitch angle, yaw angle). In an embodiment, the first pose and the second pose are defined in relation to a frame of reference of the object under test.

In FIG. 6A, three registration markers 610, 612, 614 lie on a plane, while a fourth registration marker 616 lies below the plane. The dashed line 624 represents the altitude of a tetrahedron 620 having an apex 616 and a base 622, where the base 622 has base vertices 610, 612, 614. In FIG. 6A, the tetrahedron 620 is arranged to place the base 622 above the apex 616. A first image obtained by the camera in the first pose 600 and a second image obtained by the camera in the second pose 602 together provide a relatively large amount of information to enable registering of object points captured in the first pose and object points captured in the second pose. This relatively large amount of information arises from the relatively large shift of the apex point 616 in relation to the base points 610, 612, 614 when viewed in the first image and the second image.

In FIG. 6B, the three registration markers 610, 612, 614 lie on a plane, and the fourth registration marker 618 likewise lies on the same plane. A first image obtained by the camera in the first pose 600 and a second image obtained by the camera in the second pose 602 together provide a relatively small amount of information to enable registering of object points captured in the first pose and object points captured in the second pose. This relatively small amount of information arises from the relatively small shift of the point 618 in relation to the base points 610, 612, 614 when viewed in the first image and the second image.

Figure 6C:
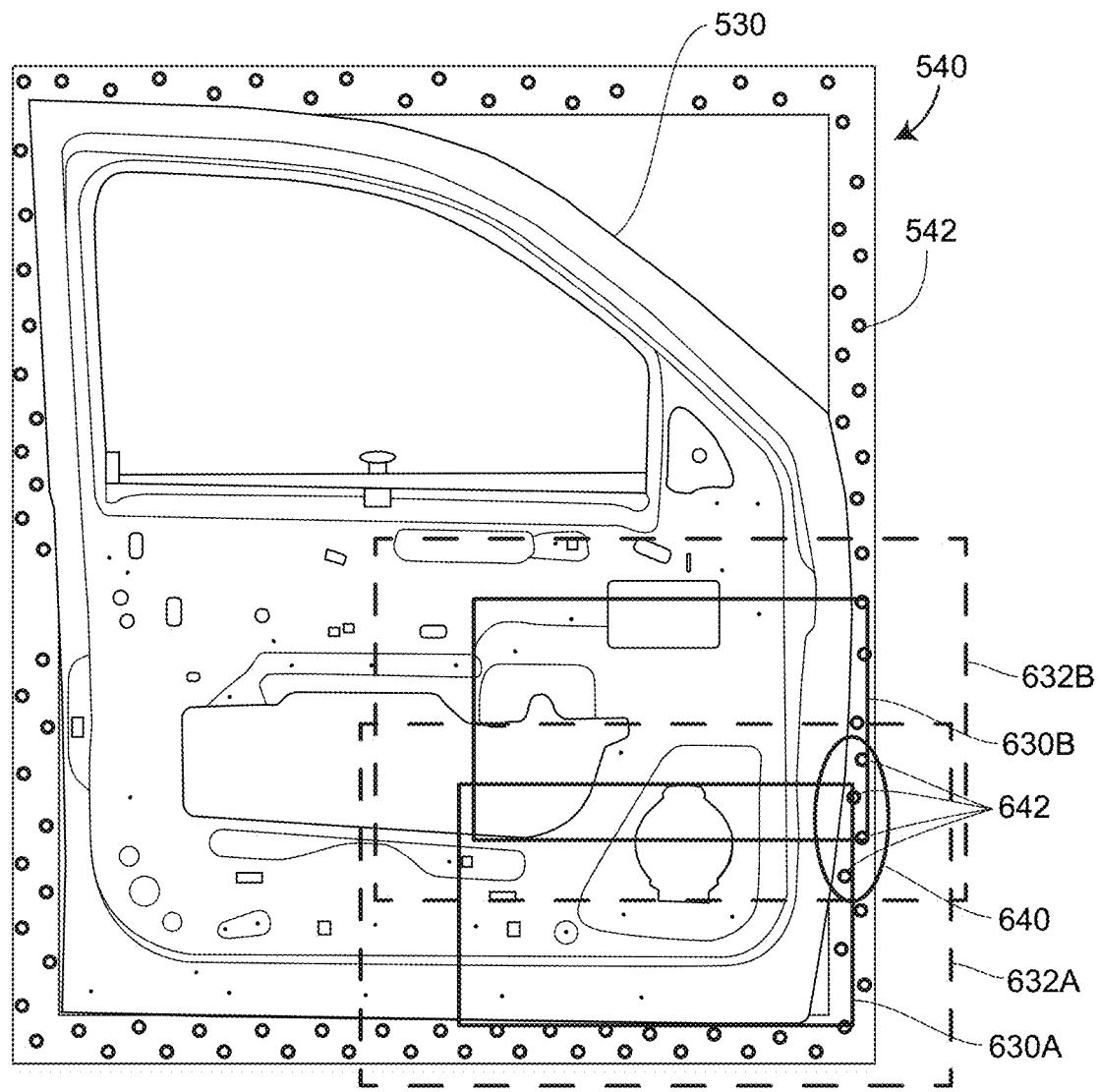
FIG. 6C, 6D are schematic illustrations of an automobile door being measured using traditional registration methods.
Figure 6D:
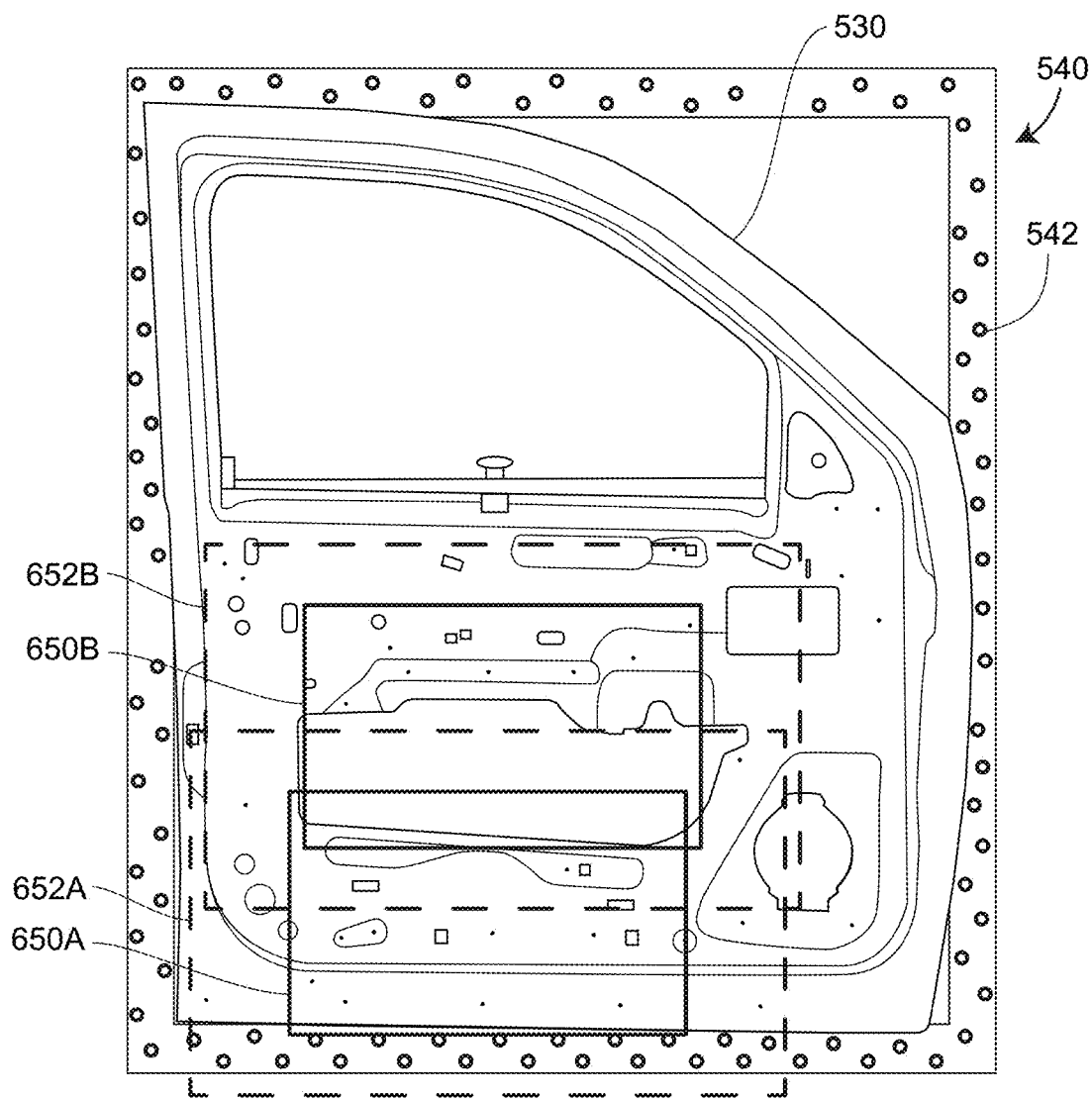

Another limitation in the use of registration markers arises from the requirement that a relatively large number of registration targets be provided to get adequate registration. Examples of this limitation are illustrated in FIGS. 6C, 6D. In FIG. 6C, in a first instance, a triangulation scanner or measuring device 510 having a camera such as 360, 370 and a projector such as 330 obtains 3D coordinates over a region 630A. A wide FOV camera (such as camera 512) coupled to the triangulation scanner or measuring device 510 captures an image over a larger region 632A. In a second instance, the triangulation scanner obtains 3D coordinates over a region 630B. The wide FOV camera coupled to the triangulation scanner captures an image over a larger region 632B. A collection of registration targets 642 are visible in a region 640 within the overlap of the regions 632A, 632B. As can be seen, relatively few registration targets 642 are visible in the first instance and the second instance. Consequently, registration is relatively weak in this case.

In FIG. 6D, in a third instance, a triangulation scanner or measuring device 510 obtains 3D coordinates over a region 650A. A wide FOV camera coupled to the triangulation scanner or measuring device 510 captures an image over a larger region 652A. In a fourth instance, the triangulation scanner or measuring device 510 obtains 3D coordinates over a region 650B. The wide FOV camera coupled to the triangulation scanner or measuring device 510 obtains 3D coordinates over a larger region 652B. In this case, there are no targets or registration markers 542 that overlap the regions 652A, 652B, which eliminates the possibility of registration between these regions without attaching some registration markers to the object 530 or using features of the object 530 for registration. Although it would be possible to affix registration markers to the object 530, users seldom desire to attach registration markers to an item under test 530 because, in many cases, those registration markers would have to be removed before shipping the completed product.

In an embodiment, polarization cameras and polarization markers are used to eliminate these shortcomings in the use of ordinary cameras with ordinary registration markers, as further described herein below in reference to FIGS. 17A, 17B.

FIGS. 7A, 7B, 7C depict a polarization camera 798 having a lens 795, a photosensitive array 797, and a polarization grid 796 placed between the lens 795 and the photosensitive array 797. In an embodiment, the polarization grid 796 includes a plurality of small linearly polarized filters 799B rotated to at least three different angles. FIG. 7B depicts a portion of the photosensitive array 797 having pixel elements 799A aligned to corresponding polarization filter elements 799B of the polarization grid 796, where elements of the polarization grid 796 are aligned to pixels 799A of a photosensitive array 797. The polarization camera 798 may further include an optical filter that passes selected wavelengths of light.

FIG. 8 is a polarization camera 890 that includes a lens 891, a beam-splitter prism 892, three or more linear polarizing filters 893A, 893B, 893C and three or more photosensitive arrays 894A, 894B, 894C. The photosensitive arrays include support electronics. The polarization camera 890 may further include an optical filter than passes selected wavelengths of light. In an embodiment, an optical filter coating is applied to one or more lens elements. In another embodiment, an optical filter is included as a separate glass filter element.

FIG. 9A illustrates a polarizer assembly 930 that includes a linear polarizer 932 and a rotation mechanism 934 that enables rotation to three or more angles, either by hand or by activating a motor. FIG. 9B illustrates an embodiment for a polarizer assembly 940 that includes three or more linear polarizers 942, 944, 946, 948, each having a different angle of polarization. The polarizer assembly 940 further includes a rotation mechanism 949 for rotating the polarizers one at a time in front of or behind an aperture 952. The polarizer assembly 930 or 940 is placed in front of camera assembly 950 (FIG. 9C) that includes aperture 952, lens 954, and photosensitive array 956, which further includes support electronics. The camera assembly 950 may further include an optical filter than passes selected wavelengths of light. The combination of the polarizer assembly 930 or 940 and the camera assembly 950 is referred to as a polarization camera.

FIGS. 10A, 10B, 10C, 10D illustrate different polarization states 1081, 1082, 1083, 1084 obtained by an electro-optic assembly 1085 of a polarization camera 1080. In an embodiment, the electro-optic assembly 1085 includes a liquid-crystal polarizer and support elements. Further elements of the polarization camera 1080 include lens 1088 and photosensitive array 1089. The polarization camera 1080 may further include an optical filter 1087 that passes selected wavelengths of light. In an embodiment, the optical filter 1087 is applied as a coating to one or more lens elements. In another embodiment, the optical filter 1087 is included as a separate glass filter element.

Figure 11A:
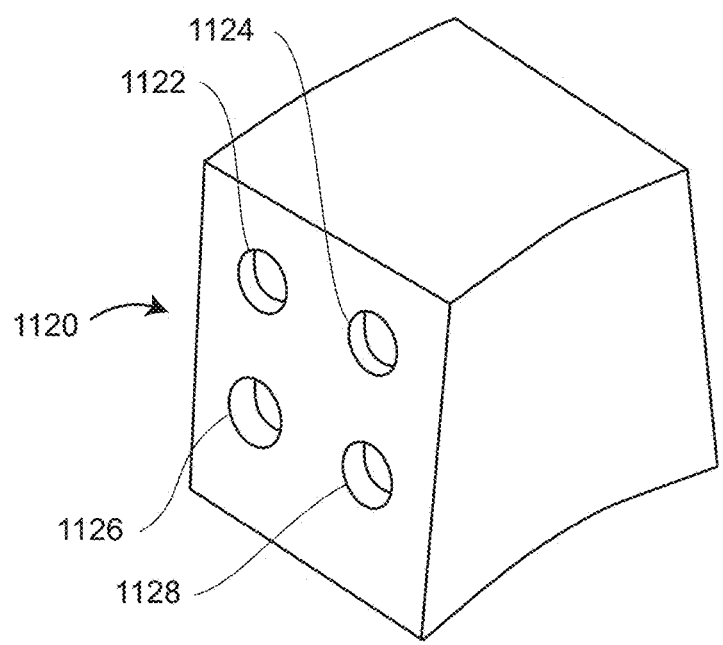
FIG. 11A is a perspective view of a camera assembly that includes four individual cameras according to an embodiment.
Figure 11B:
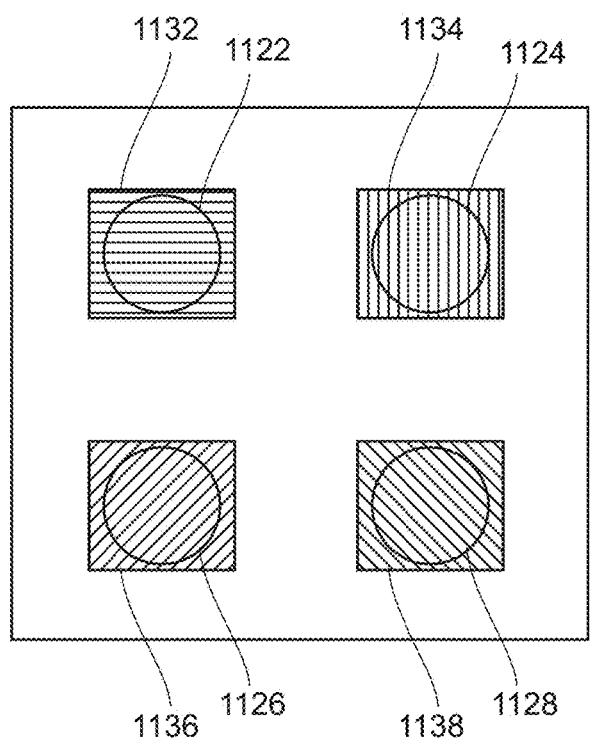
FIG. 11B is a schematic representation of the direction in which polarizers are oriented in each of the four cameras of FIG. 11A according to an embodiment.
Figure 11C:
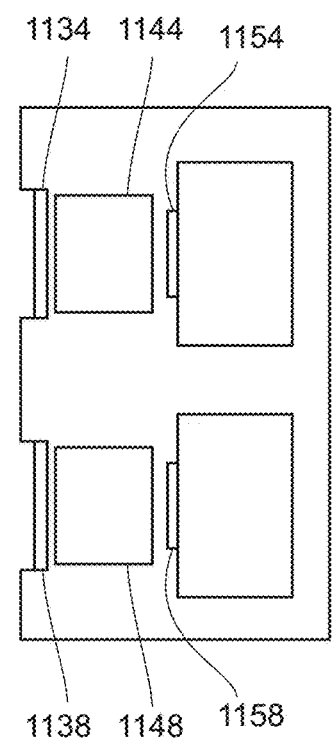
FIG. 11C is a schematic cross-sectional representation of a four-camera assembly according to an embodiment.

An embodiment of a polarization camera 1120 is shown in FIGS. 11A, 11B, 11C. The polarization camera 1120 includes apertures 1122, 1124, 1126, 1128, each followed by a corresponding polarizer 1132, 1134, 1136, 1138, respectively. In an embodiment, the polarizers 1132, 1134, 1136, 1138 have corresponding linear polarization angles of 0, 90, 45, 135 degrees, respectively. In another embodiment, there are only three linear polarizers rather than four. The polarizers are positioned adjacent to lenses and photosensitive arrays having supporting electronics. In an embodiment illustrated in the schematic side view FIG. 11C, the polarizer 1134 is positioned adjacent to lens 1144 and photosensitive array 1154, and the polarizer 1138 is positioned adjacent to lens 1148 and photosensitive array 1158.

Figure 12A:
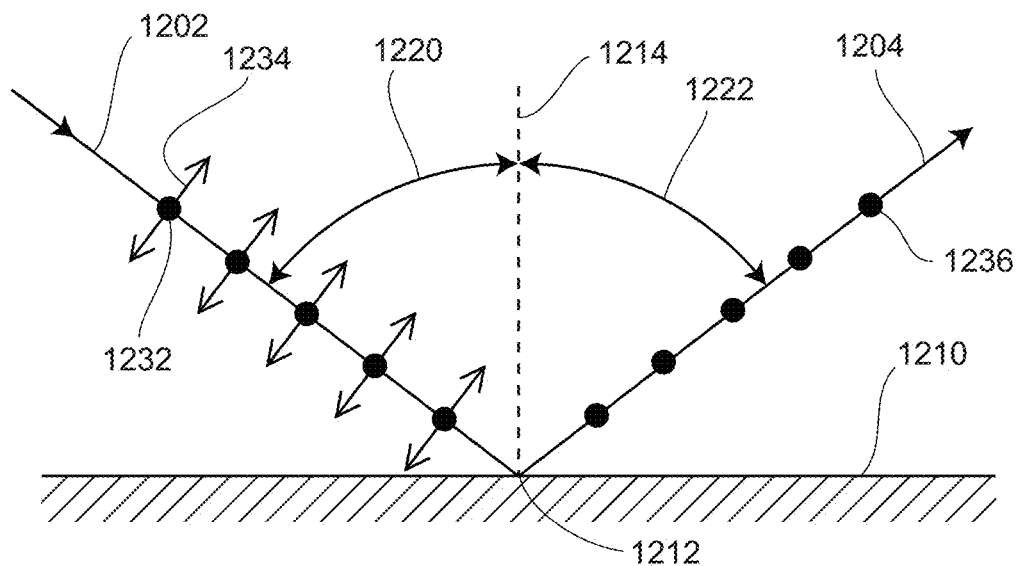
FIGS. 12A, 12B, 12C, 12D, 12E illustrate the reflection of s- and p-polarization components for light incident at the Brewster angle.

FIG. 12A shows a ray of light 1202 striking a dielectric material 1210 at a point 1212, which thereafter undergoes a type of reflection referred to as specular reflection. A normal vector 1214 is drawn perpendicular to the material 1210 at the point 1212. A plane that includes the ray of light 1202 and the normal vector 1214 is referred to as the plane of incidence. The angle between the incident ray of light 1202 and the normal vector 1214 is referred to as the angle of incidence 1220. Polarization of the light in the ray of light 1202 may be decomposed into two linear components: an s polarization 1232 perpendicular to the plane of incidence and a p polarization 1234 in the plane of incidence. Both s polarization and p polarization components are perpendicular to the ray of light 1202. For a dielectric material 1212, a portion of the incident ray of light 1202 reflects off the material 1210 in a ray 1204 having at an angle of reflection 1222 equal to the angle of incidence 1220. When the angle of incidence 1220 and angle of reflection 1222 equal zero degrees, there is no distinction between s and p polarization and both types of polarization behave in the same way. However, as the angle of incidence 1220 increases above zero degrees, the relative proportion of reflected p polarization declines in relation to the reflected s polarization. When the angle of incidence 1220 equals an angle referred to as the Brewster's angle, the fraction of p polarization reflected from the material 1210 falls to zero so that all the reflected light has s polarization 1236. FIG. 12A illustrates the special case in which the angle of incidence 1220 equals Brewster's angle. This is evident from the figure since the reflected ray 1204 includes no p polarized light.

Figure 12B:
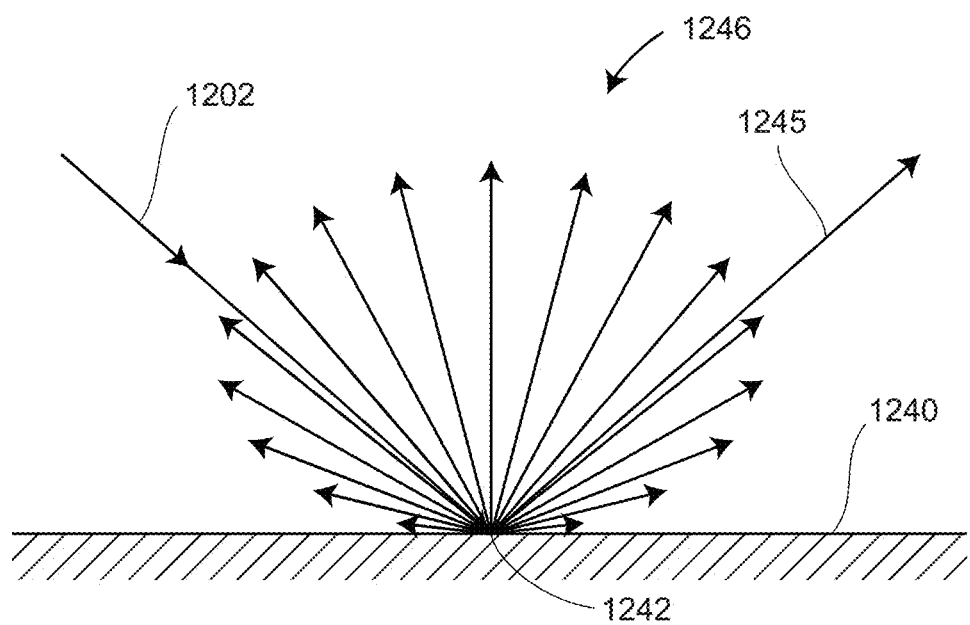

FIG. 12B show a ray of light 1202 striking a second dielectric material 1240 at a point 1242, which partly undergoes a specular reflection of a ray 1245 and partly undergoes a diffuse reflection in which reflected rays of light 1246 travel in a variety of directions rather than a single direction.

Figure 12C:
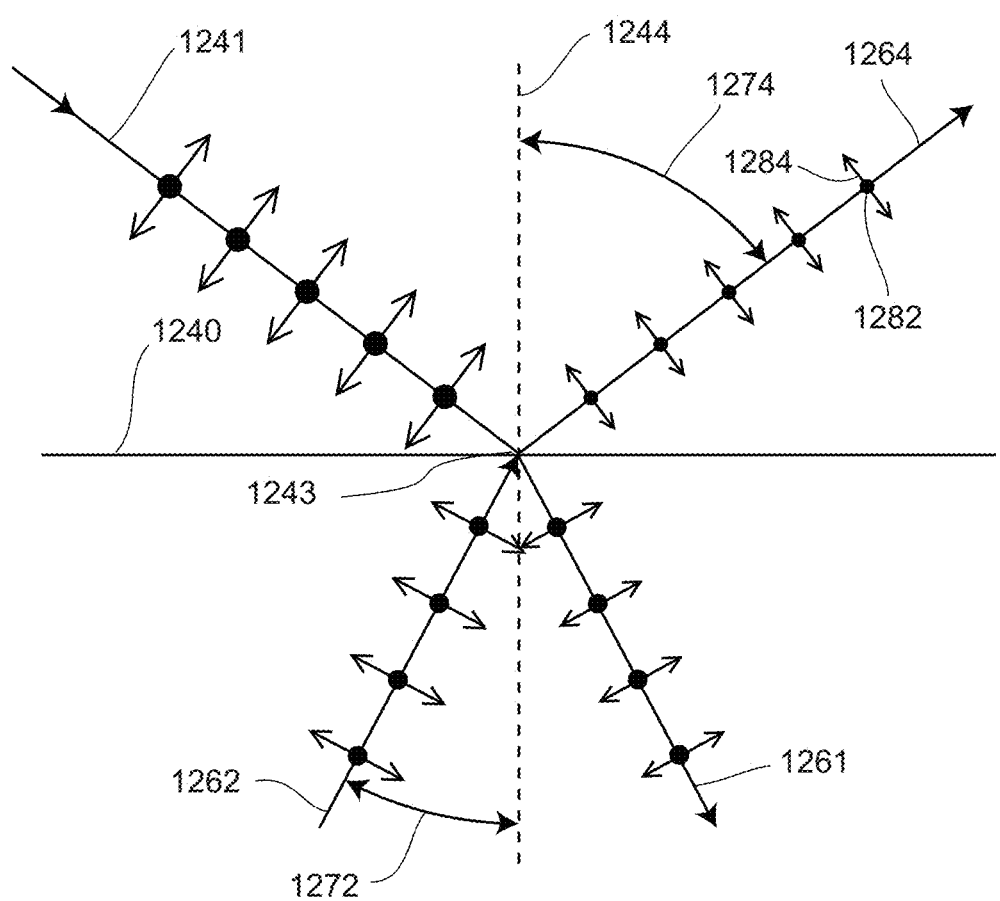

FIG. 12C illustrates the mechanism responsible for diffuse reflection off a dielectric material 1240. The light 1241 striking the surface 1240 interacts with the dielectric material in a shallow region near the surface 1240, passing into the material in a ray of light 1261. In most cases, the light in the shallow region of material undergoes multiple scattering events within the material. After a final scattering event, a representative ray of light 1262 in the material passes into the air as a ray 1264. The ray of light 1262 need not emerge from the exact entry point 1243. The ray of light 1262 in the material following the final scattering event emerges at an angle 1272, and the ray of light transmitted into the air has an angle 1274. These angles satisfy Snell's Law where the angle of incidence is 1272, the angle of transmittance is 1274, the index of refraction of the incident ray is the index of refraction n of the material, and the index of refraction of the transmitted ray is the index of refraction of air, which equals one. In general, diffusely scattered light tends to have a higher proportion of p polarized light 1284 than s polarized light 1282, although the s polarized light does not drop to zero for any angle 1274.

In general, for diffuse scattering, there will be several rays of light 1262 passing out of the material into the air, each of the emerging rays of light 1264 lying in a different plane. Each of the planes that contain these emerging rays 1264 further contains the vector 1244 normal to the material surface. In this sense, the planes on which the emerging rays reside are equivalent to the plane of incidence, but there will several such planes, each corresponding to one of the diffusely scattered rays of light. This is one way that diffuse reflection (i.e., scattered light) is different than specular reflection for which the incident ray and reflected ray both lie on the single plane of incidence.

Figure 12D:
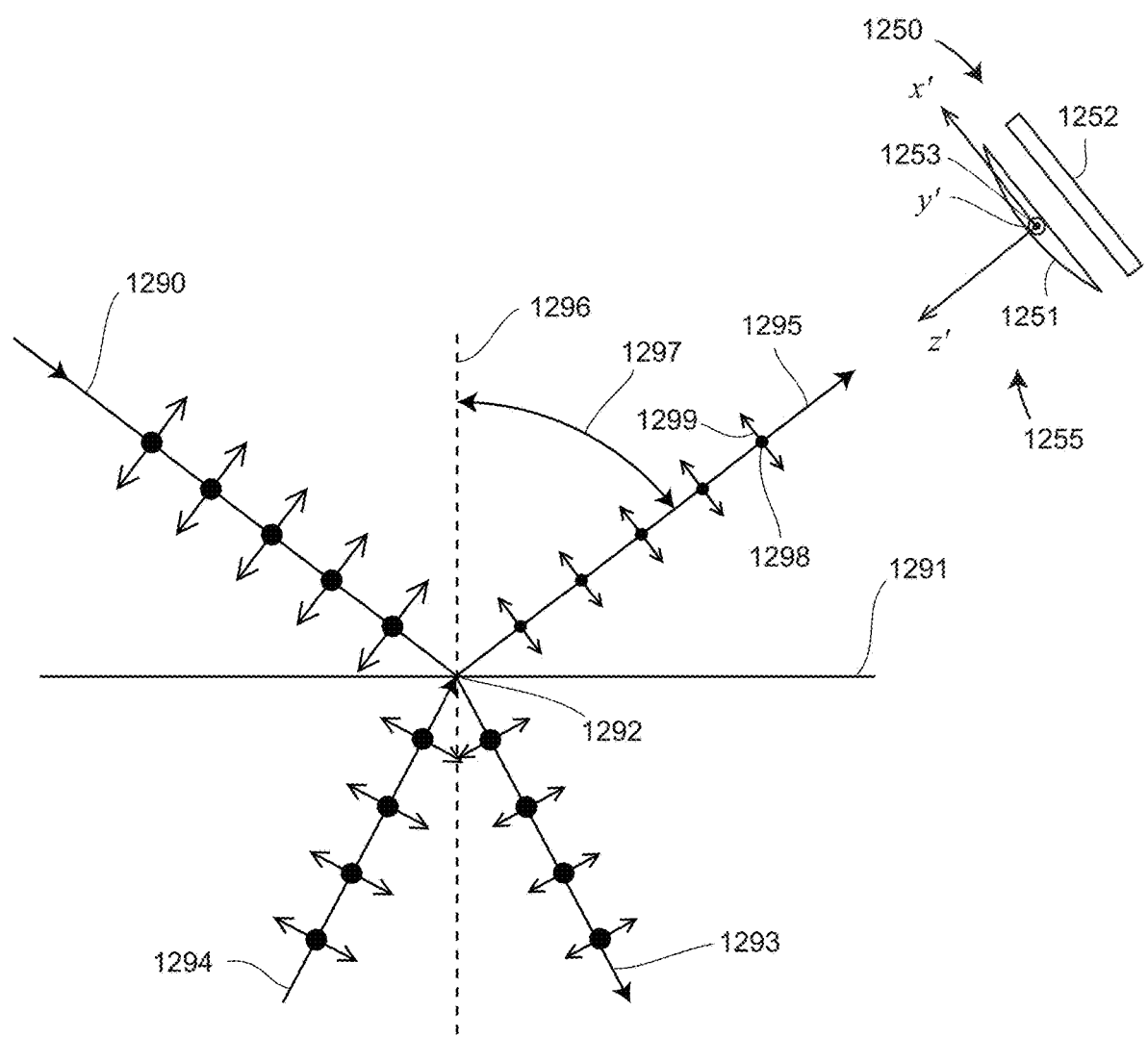

FIG. 12D shows the general situation in which reflected light may be specular, diffuse, or a combination of the two. A ray of light 1290 enters the surface 1291 at a point 1292. Some of the light reflects specularly at an angle of reflection 1297, and some of the light reflects diffusely, entering the surface 1291 in a final scattered ray 1293 and exiting the material as a ray 1294 before passing into the air as a ray of light 1295. The angle of reflection 1297 is drawn relative to the normal vector 1296. In general, diffusely reflected light will lie on many planes following reflection, as explained in the last paragraph.

A camera 1250 includes a lens 1251 and a photosensitive array 1252, the lens having a perspective center 1253. The camera 1250 has a frame of reference 1255 with an origin at the perspective center 1253, an x' axis in the plane of the paper, a y' axis pointing into the paper, and a z' axis pointing toward the reflected ray of light 1295. The reflected light 1295 has some combination of s polarization 1298 and p polarization 1299. If the light 1295 is diffusely reflected, it will contain mainly p polarization and hence align to the x' or −x' axis. If the light 1295 is specularly reflected, it will contain mainly s polarization and hence align to the y' or −y' axis. For a spherical coordinate system drawn with respect to the surface 1291 and point 1292, the angle of reflection 1297 can be considered a zenith angle drawn with respect to the normal vector 1296. For this fixed zenith angle 1297, there is a corresponding azimuth angle of light reflecting off the surface 1291 corresponding to an angle of rotation about the normal axis 1290.

Figure 12E:
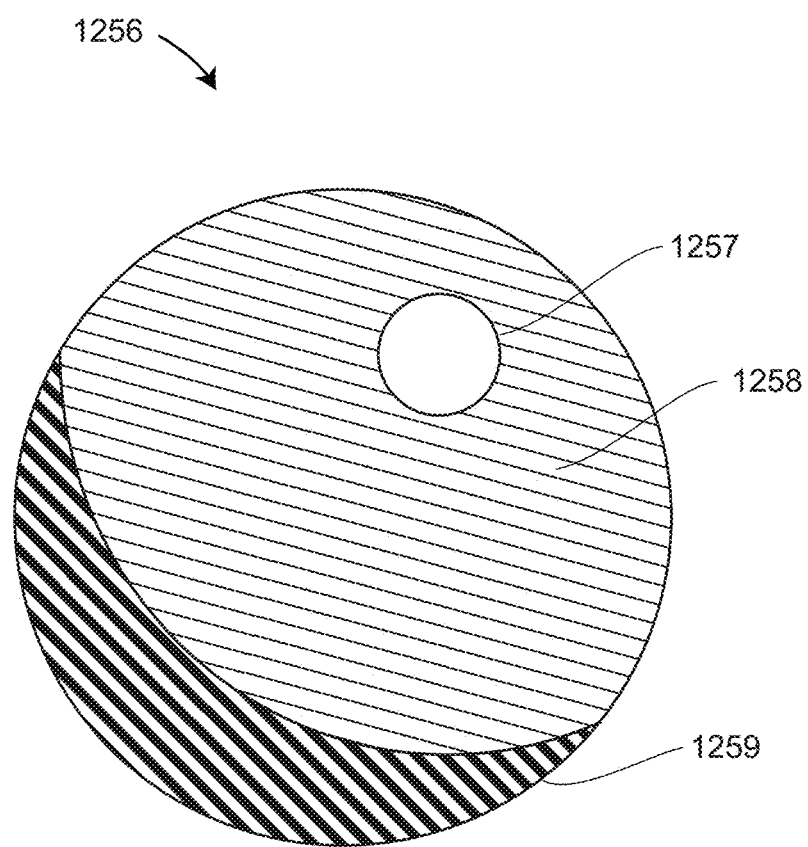

FIG. 12E shows a ball 1256 illuminated by an overhead light. The area 1257 is a relatively bright reflection, which may include a relatively large proportion of specularly reflected light. The area 1259 includes a portion of the ball that is mostly in shadow, while the area 1258 includes a region having a level of illumination intermediate between the areas 1257 and 1259. If the ball is made of a dielectric material, the regions 1258 and 1259, which are not so directly illuminated by the overhead light, are likely to include much more p polarized light than s polarized light. Hence in most practical cases in which dielectric materials are used, the reflected light is diffusely reflected. It is also true that the degree of polarization, discussed further herein below, becomes smaller when specular and diffuse reflections are mixed together. In an embodiment, the reflected light is taken to be diffusely reflected except in one of two cases: the reflected light is bright enough to saturate the camera pixels (which would indicate mostly specularly reflected light) or the degree of polarization exceeds 0.3 (which would indicate a substantial amount of both specular and diffuse reflected light).

Figure 13A:
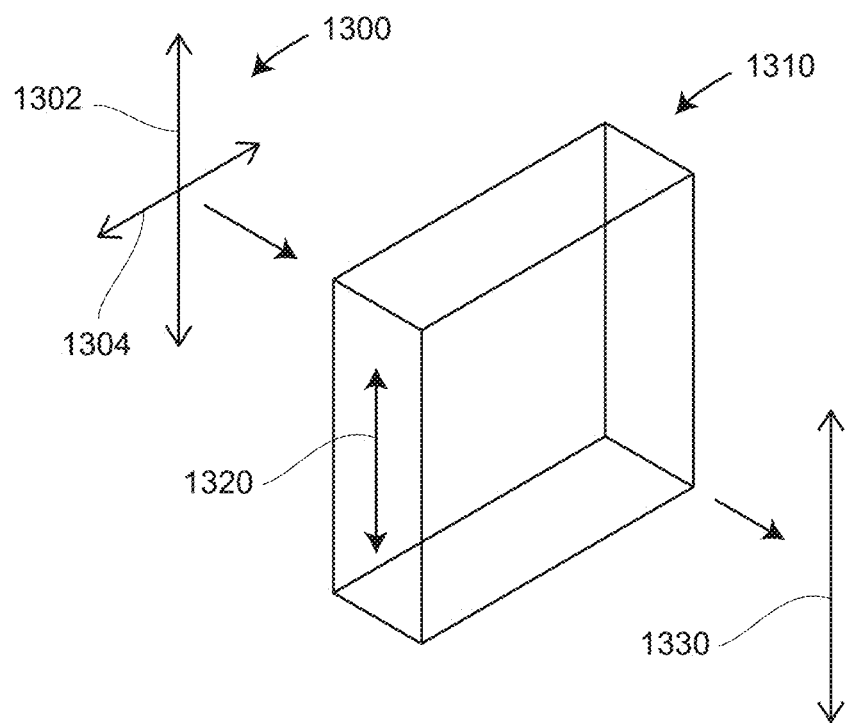
FIGS. 13A and 13B are schematic representation of a linear polarizer passing unpolarized or partially polarized light.
Figure 13B:
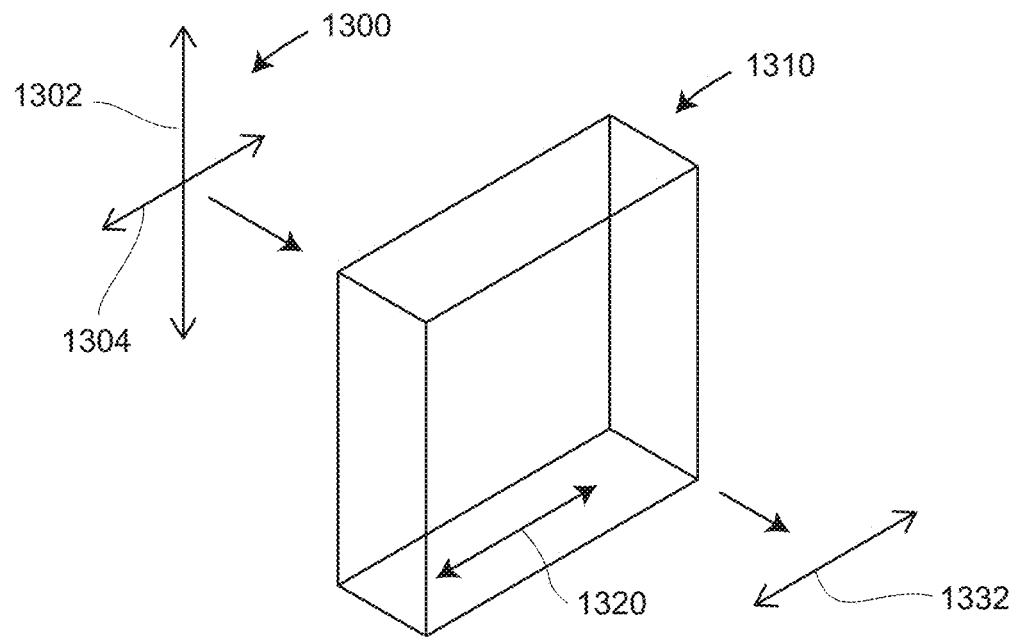

FIGS. 13A, 13B show light 1300 having a first (vertical) polarization component 1302 and a second (horizontal) polarization component 1304 orthogonal to the first polarization component 1302. In FIG. 13A, the light 1300 is incident on a linear polarizer 1310 oriented to place the transmission axis 1320 of the linear polarizer 1310 in a vertical direction. If the linear polarizer 1310 were considered an ideal polarizer, all the transmitted light 1330 would be linearly polarized in the vertical direction. In a real polarizer a small amount of polarization orthogonal to the transmission axis will also pass through the linear polarizer 1310. In FIG. 13B, the linear polarizer 1310 is oriented to place the transmission axis 1320 in a horizontal direction. In an embodiment where the linear polarizer can be treated as an ideal polarizer, all the transmitted light 1332 passes through the polarizer with a horizontal polarization.

There is a type of light referred to as unpolarized light comprising short wave trains of differing polarization that are distributed randomly. Many light sources such as the sun and incandescent lamps emit light that is unpolarized or nearly unpolarized. After striking a dielectric material at a non-zero angle of incidence, randomly polarized light reflects off the dielectric material and may undergo specular or diffuse scattering. For specular reflection, the reflected light has a larger amount of s polarization than p polarization. For diffuse reflection, the reflected light has a larger amount of p polarization than s polarization. The reflected light is said to be partially polarized, which is to say that it includes an unpolarized portion and a linearly polarized portion. If such partially polarized light is sent through a polarizer that is rotated through a multiplicity of angles covering 180 degrees, the observed irradiance (light power per unit area) passed through polarizer can be seen to vary sinusoidally with the rotation angle of the polarizer, as shown in FIG. 14.

Figure 14:
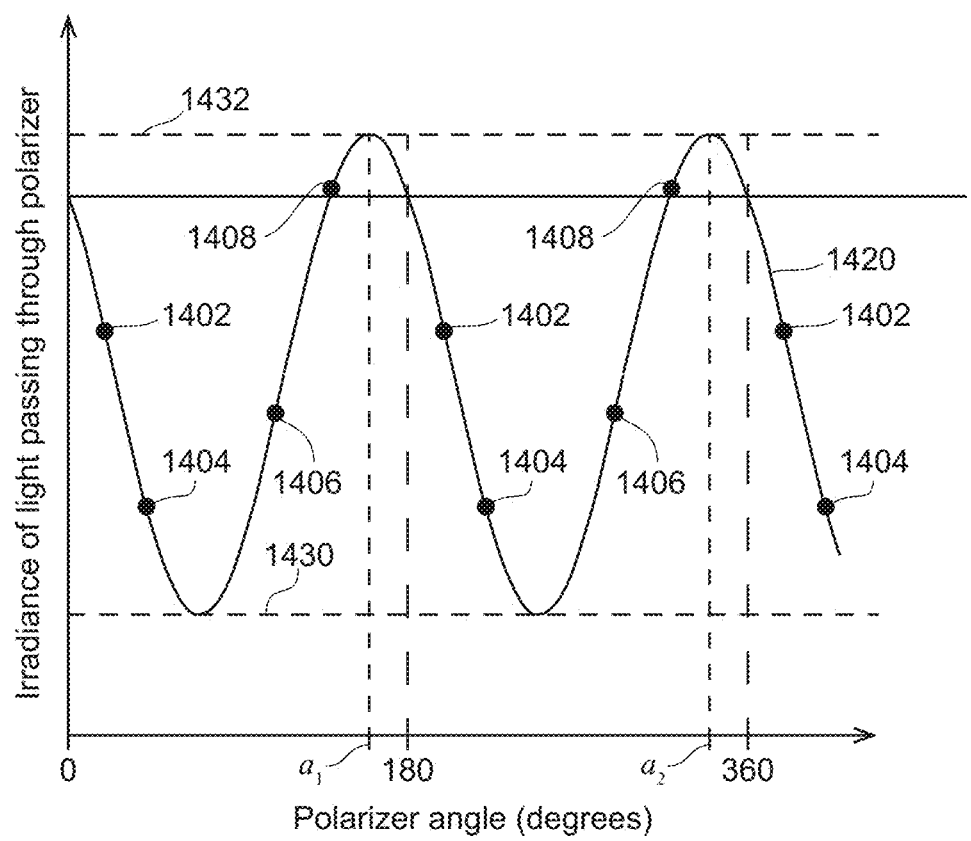
FIG. 14 illustrates the sinusoidal variation in the irradiance of partially polarized light passing through a rotated polarizer.

In FIG. 14, a polarizer placed in front of a camera is rotated over rotation angles from 0 to 360 degrees, as indicated on the horizontal axis. A photodetector is used to measure the optical power passing through the polarizer and from this the irradiance (optical power per unit area) is measured, as indicated on the vertical axis. As can be seen in FIG. 14, one complete sinusoidal cycle is completed for each 180-degree rotation of the polarizer. In an embodiment, measurements of the irradiance and angle are made at the collections of points such as the points 1402, 1404, 1406, and 1408. These points are used to construct the sinusoidal plot 1420. The irradiance varies from a minimum value 1430 to a maximum value 1432.

It can be shown that the sinusoidal plot 1420 has irradiance values proportional to $\cos(2(a-a_{max})/360)$, where a is the angle of the polarizer and $a_{max}$ is the angle of the polarizer at which the value is maximum. In this equation, a and $a_{max}$ are in units of degrees. If the reflected light is known to be either specularly reflected or diffusely reflected, the orientation of a dielectric material may be determined by noting the rotation angle of the polarizer at which the signal level received by a camera photodetector is maximum.

FIGS. 15A, 15B, 15C, 15D, 15E, 15F are views of a selection of possible polarization targets according to embodiments of the present invention. In each case, the targets are made of material having relatively low conductivity. So, for example, the materials used would not be bare metal. Also, carbon fiber-based structures do not usually work well because the shape and orientation of the individual fibers alter the polarization strongly, in many cases with little relation to the actual geometry. Based on experiments, it has been found that suitable materials include porcelain (such a smooth cup), plastics (such as a polypropylene storage container), and rubber (such as cables). Therefore, the polarization target may be made from a non-metallic material. Dark or black materials have been found to perform well for this purpose. This may be explained by the Umov effect, which states that the degree of linear polarization of light is inversely proportional to the albedo of an object. Hence dark objects, which have lower albedo, have a larger degree of linear polarization. Metals having a black anodized oxide coating (such as aluminum oxide) is another target material that has been found to perform well.

In FIGS. 15A, 15B, 15C, 15D, 15E, 15F, each target 1500A, 1500B, 1500C, 1500D, 1500E, 1500F, respectively, includes at one or more marks 1502A, 1502B, 1502C, 1502D, 1502E, 1502F, respectively, used to identify and locate the target, and three or more sloping sides 1504A, 1504B, 1504C, 1504D, 1504E, 1504F, respectively. FIG. 15F includes three sloping sides; FIGS. 15A, 15B include four sloping sides; FIGS. 15C, 15D include six sloping sides; and FIG. 15E includes seven sloping sides. The marks on FIGS. 15A, 15D include a spoke pattern that serves as an identifier and a circular spot that serves as a location mark. The marks on FIGS. 15B, 15C, 15E include a multiplicity of dots that serve to identify and locate the targets 15B, 15C, 15E. The single dot on FIG. 15F serves as a locator mark.

Figure 15G:
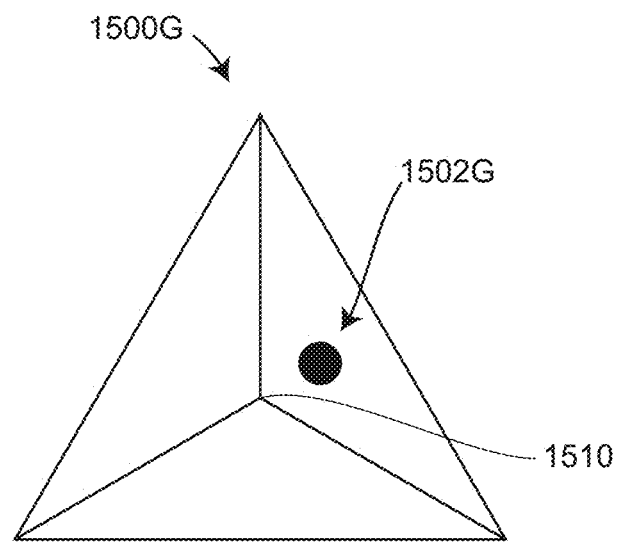
FIGS. 15G, 15H are top views of polarization targets according to an embodiment.
Figure 15H:
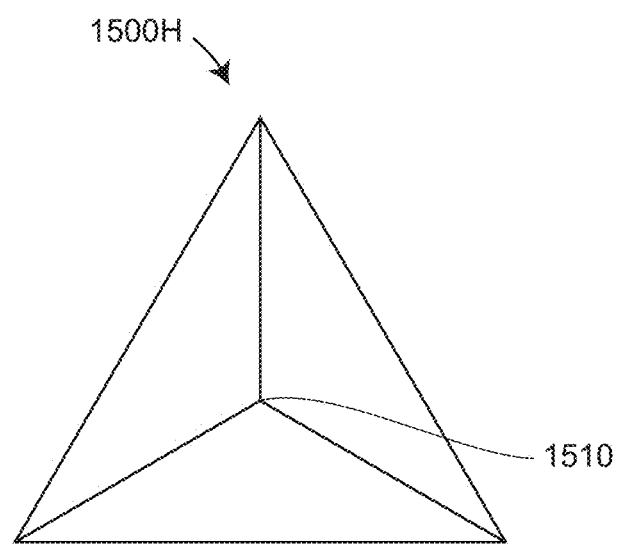

FIGS. 15G, 15H are top views of polarization targets 1500G, 1500H, respectively, each having three surfaces. In an embodiment, the three surfaces meet in a single apex point 1510. The polarization target 1500G further includes a location mark 1502G. The apex point 1510 may also serve as a location mark, the position of which on an image may be determined as the point of intersection of the edges that separate the three surfaces.

Figure 16A:
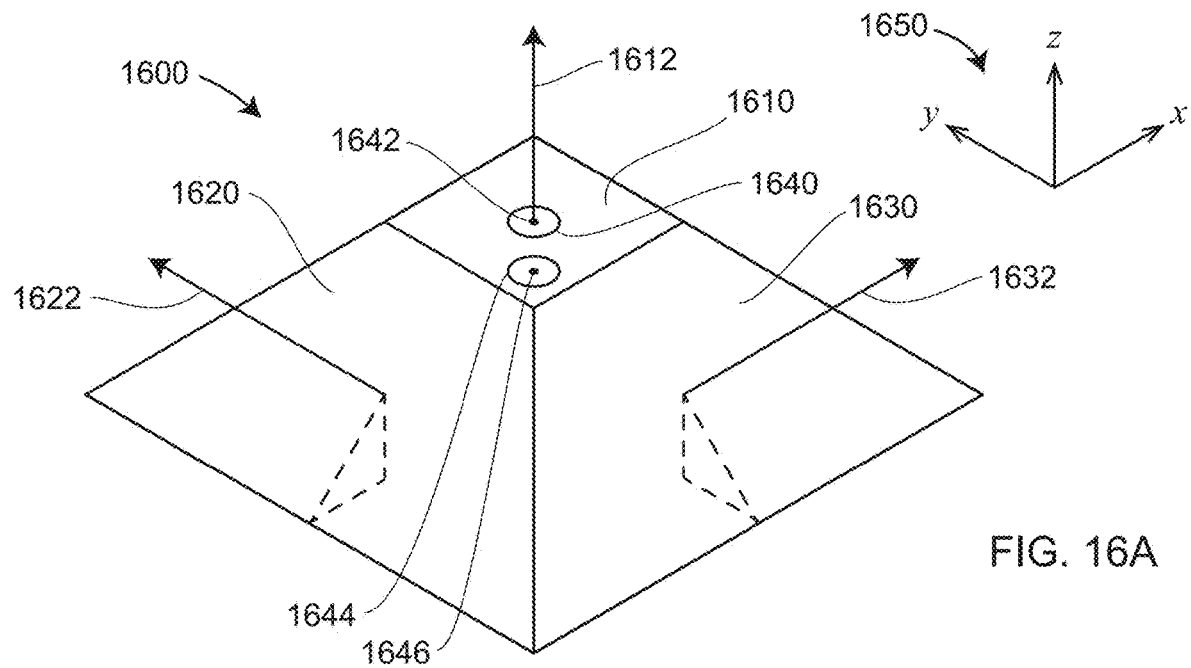
FIGS. 16A, 16B, 16C are isometric views of target normal vectors for the target in different orientations according to an embodiment.

FIG. 16A is a perspective view of an exemplary polarization target 1600 having a marker surface 1610 that includes a marker 1640 having a center 1642 and a marker 1644 having a center 1646. In an embodiment, the polarization target 1600 further includes four sides, two of the sides or surfaces 1620, 1630 being visible in FIG. 16A. Each of the four sides slopes away from the marker surface 1610 at an angle of 45 degrees. The surfaces 1620, 1630 have outward facing normal vectors 1622, 1632, respectively. The marker surface 1610 has an outward facing normal vector 1612. A geometrical representation of the polarization target 1600 is provided to a processor that performs calculations described below. Such geometrical characteristics include angles, dimensions, and positions of markers. The geometrical characteristics provided to a processor are given in a frame of reference 1650 that in an embodiment includes x, y, z axes.

Figure 16B:
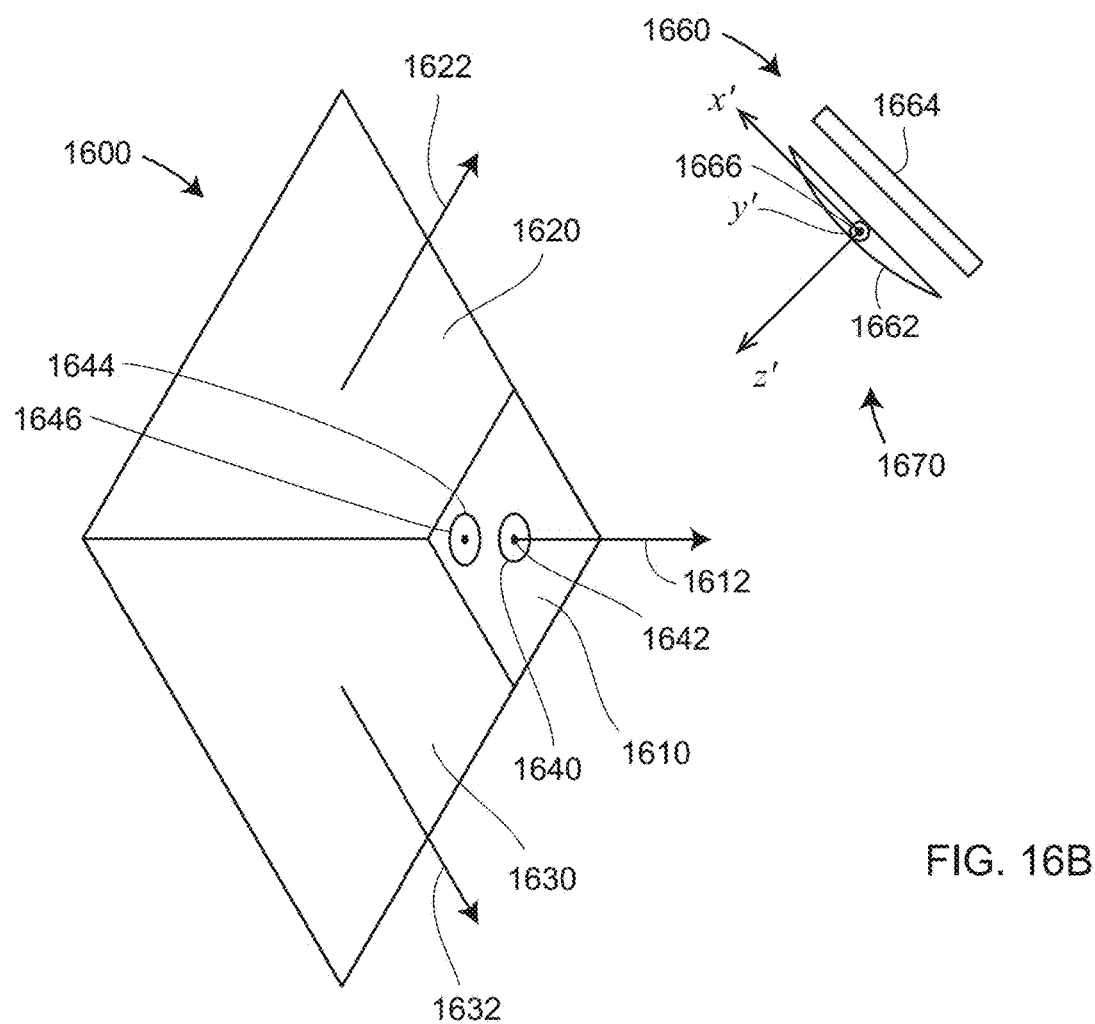

FIG. 16B shows the polarization target 1600 in an arbitrary orientation relative to a polarization camera 1660. The polarization camera 1660 includes a lens 1662 and a photosensitive array 1664. The polarization camera 1660 further includes a perspective center 1666 through which rays of light are considered to pass. The polarization camera 1660 has a camera frame of reference 1670, which in an embodiment includes the axes x, y, z, where the z' axis is the direction pointing into the polarization camera 1660 along the camera optical axis. In an embodiment, the polarization camera 1660 includes oriented polarization elements 799B as in FIGS. 7A, 7B, 7C. In other embodiments, other types of polarization cameras are used.

Each of the marker surfaces 1610, 1620, 1630 illuminate pixels covering a region of the photosensitive array 1664. The polarization camera provides the provides polarization information for the light illuminating these regions. The irradiance at each of the three or more polarization angles is exemplified by the points 1402, 1404, 1406, 1408 in FIG. 14. Such irradiances may be used to determine polarizer angles such as $a_1$ and $a_2$ at which the transmitted irradiance is maximum. These determined angles and the location of the target center 1642 may be used to align the target representation to its correct position and orientation in space using mathematical methods such as those now described.

The "degree of polarization" DoP of light reflected off a surface is DoP=$(I_{max}-I_{min})/(I_{max}+I_{min})$, where $I_{max}$ corresponds to the level 1432 and $I_{min}$ corresponds to the level 1430 in FIG. 14. The DoP can be used to determine the zenith angle of the normal vector of a surface with respect to the z' vector. The zenith angle of a vector in the camera frame of reference 1670 is the angle between the vector and the positive z' axis. However, the calculation of the DoP may be error prone and demands prior knowledge of the refractive index of the polarization target material. The zenith angle of the normal vector is not needed or used in the method described herein below.

Each of the angles $a_1$ and $a_2$ in FIG. 14 corresponding to the maximum value of the sinusoid in FIG. 14 are referred to referred to as an "angle of polarization" AoP. The AoP represents the azimuth angle of the normal vector. The azimuth angle of a normal vector in the camera frame of reference 1670 is the angle between the x' axis and a projection of the normal vector onto the x'-y' plane. FIG. 14 shows that the two angles of polarization $a_1$, $a_2$ refer to normal vectors having azimuth angles separated by 180 degrees. One of these normal vectors points outward from a target surface (as in the vectors 1612, 1622 and 1632 in FIG. 16A), while the other normal vector points inward from the target surface. As a matter of convention, the normal vectors of interest are taken to point outward from the target.

Figure 16C:
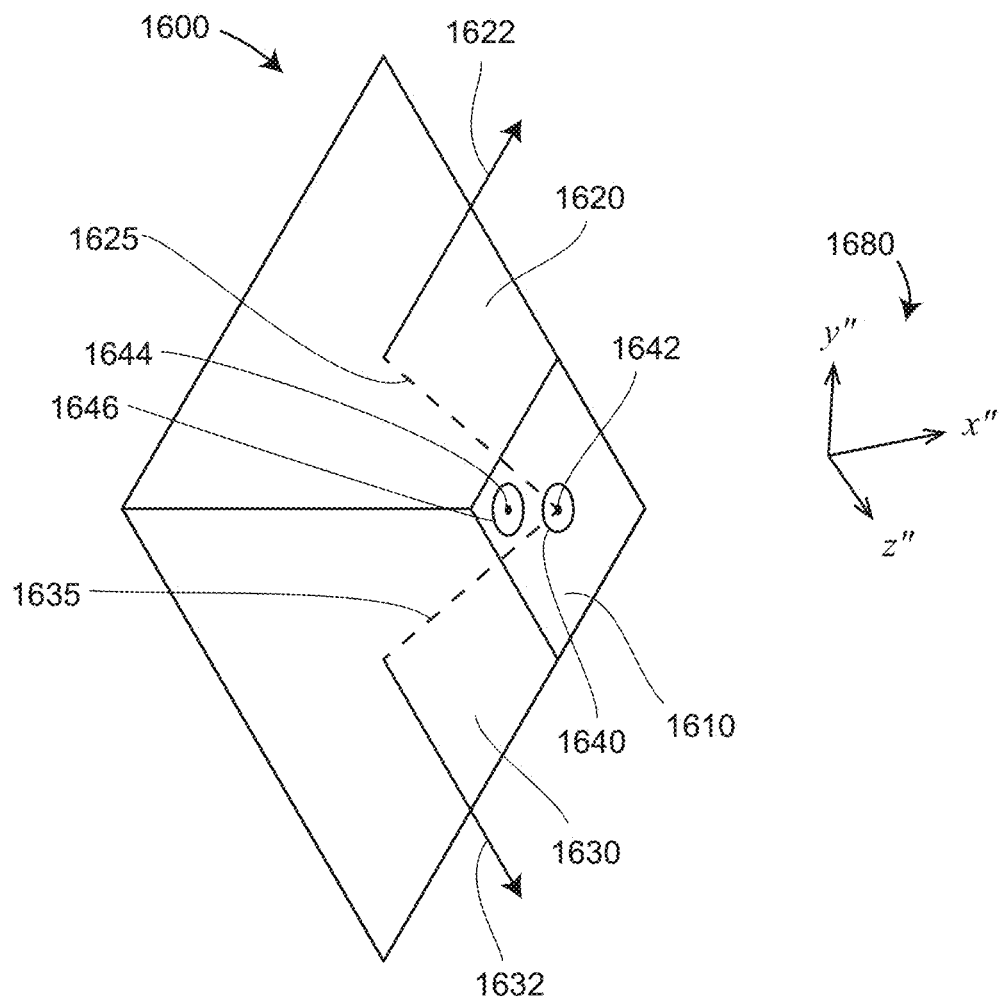

In FIG. 16C, to remove the 180-degree ambiguity in the direction of the target normal vectors, lines 1625, 1635 are drawn from the marker center 1642 to the center of each target surface. By comparing the lines 1625, 1635 to the azimuth angles of the normal vectors 1622, 1632 or to the vectors directly oppositely to 1622, 1632, it can be seen that desired outwardly pointing normal vectors are 1622, 1632. A way of stating this mathematically is that the dot product between desired outward facing normal vector such as the vector 1622 and a corresponding direction vector such as 1625 will have a positive value. In this case, the direction vector or line 1625 is directed from the center of the surface 1620 to the center of the marker 1642. In an embodiment, the relative positions and orientations of the markers 1640, 1644 are used to eliminate possible ambiguity in the roll angle of the polarization target relative to the polarization camera.

In general, the geometrical characteristics of the polarization target 1600 are provided to the processor in a reference coordinate system 1650, as shown in FIG. 16A. Within this coordinate system 1650, each marker surface 1610, 1620, 1630 is referenced by an integer index k. The normal vector for that surface k in the reference coordinate system 1650 is $n_k$. To obtain corresponding surface normal vectors $p_k$ in the frame of reference 1670 of the polarization camera 1660, the normal vectors are each multiplied by a rotation matrix R having three rotation angles that are to be determined. In other words, $p_k=Rn_k$. For example, the rotation angles used to obtain the rotation matrix R might be derived from a pitch angle, yaw angle, and roll angle, or using any other type of rotation angles.

Because, in the camera frame of reference 1670, the zenith and azimuth angles of the surface normals are taken with respect to the optical axis of the camera z', the surface normals of the polarization target 1600 as seen by the camera are also given as $p_k=R_{az}R_{ze}z'$, where z' is a column vector having components 0, 0, 1. Since the AoP calculation provided the azimuth angles for the normal vector of each visible surface of the polarization target 1600, the matrix for the azimuth rotation can be determined in terms of the azimuth angles for the normal vectors of each surface k:

$$R_{az} = \begin{pmatrix} \cos(az_k) & -\sin(az_k) & 0 \\ \sin(az_k) & \cos(az_k) & 0 \\ 0 & 0 & 1 \end{pmatrix} \quad \text{(Eq. 1)}$$

The zenith rotation matrix is given in terms of the zenith angles of the normal vectors of each surface k:

$$R_{ze} = \begin{pmatrix} \cos(ze_k) & 0 & \sin(ze_k) \\ 0 & 1 & 0 \\ -\sin(ze_k) & 0 & \cos(ze_k) \end{pmatrix} \quad \text{(Eq. 2)}$$

The surface normal vectors of the polarization target, as seen in the frame of reference 1650 of the geometrical representation, are therefore given by:

$$n_k = R^{-1} R_{az} R_{ze} \begin{pmatrix} 0 \\ 0 \\ 1 \end{pmatrix} \quad \text{(Eq. 3)}$$

For a single surface k in equation (3) above, there are four unknown angles: three angles in the rotation matrix R and one zenith angle in the rotation matrix $R_{ze}$. Since the normal vector $n_k$ each surface k of the polarization target 1600 has three coordinates (e.g., x, y, z), it follows that measurements by the camera of the AoP for at least two surfaces, which provides the azimuth rotation matrices for these two surfaces, yields a total of six equations. The corresponding number of unknowns for two measured surface azimuth angles is five: two unknown zenith angles and three unknown values for the matrix R. Therefore, with six equations and five unknowns, there is enough information to solve for the orientation of the polarization target 1600 in relation to polarization camera 1660. In other words, measurement of the AoP for two surfaces of the polarization target are enough to determine the orientation of the polarization target. In an embodiment, if the normal vectors are measured on additional surfaces of the polarization target 1600, an optimization program or methodology is used to minimize the least squared errors in the fit of the modeled normal vectors to the measured normal vectors. In other embodiments, other methods of optimization are used, for example the orientation of the polarization target may be determined using an optimization program to minimize residual errors in the orientation. In an embodiment, a marker position and orientation may be determined in another frame of reference, such as the frame of reference 1680 shown in FIG. 16C. Such a frame of reference may arise, for example, because of measurements made earlier on other markers.

The polarization camera may also determine a transverse position of a polarization target based on a position of a marker on the polarization target. For example, the location of a marker such as 1502F or 1502G may be used to determine a transverse position of the polarization target. The term transverse position here means the side-to-side position of the polarization locator mark, which is to say in a plane perpendicular to the optical axis of the polarization camera. In some cases, a second marker or marker pattern may be needed to eliminate ambiguity in the roll angle of the polarization target relative to the polarization camera. Embodiments of such second markers or marker patterns are shown in the elements 1502A, 1502B, 1502C, 1502D, 1502E. In an embodiment, a polarization target is sufficiently asymmetric in its 3D shape to enable the roll angle of the polarization target to be determined without using any marker or marker pattern. A transverse position of a marker may also be determined based on recognition of a feature point, for example, a point based on an intersection of lines of the polarization marker. An example of such an intersection point is the apex point 1510 in FIGS. 15G, 15H. In an embodiment, two cameras separated by a baseline distance are used to obtain images of a marker on the polarization target or an observed target point on the polarization target. In this case, triangulation may be used to determine a distance to the marker or target point. In this case, in an embodiment, the two cameras are used to determine the three translational degrees of freedom of the polarization target as well as the three orientational degrees of freedom of the polarization target.

Figure 17A:
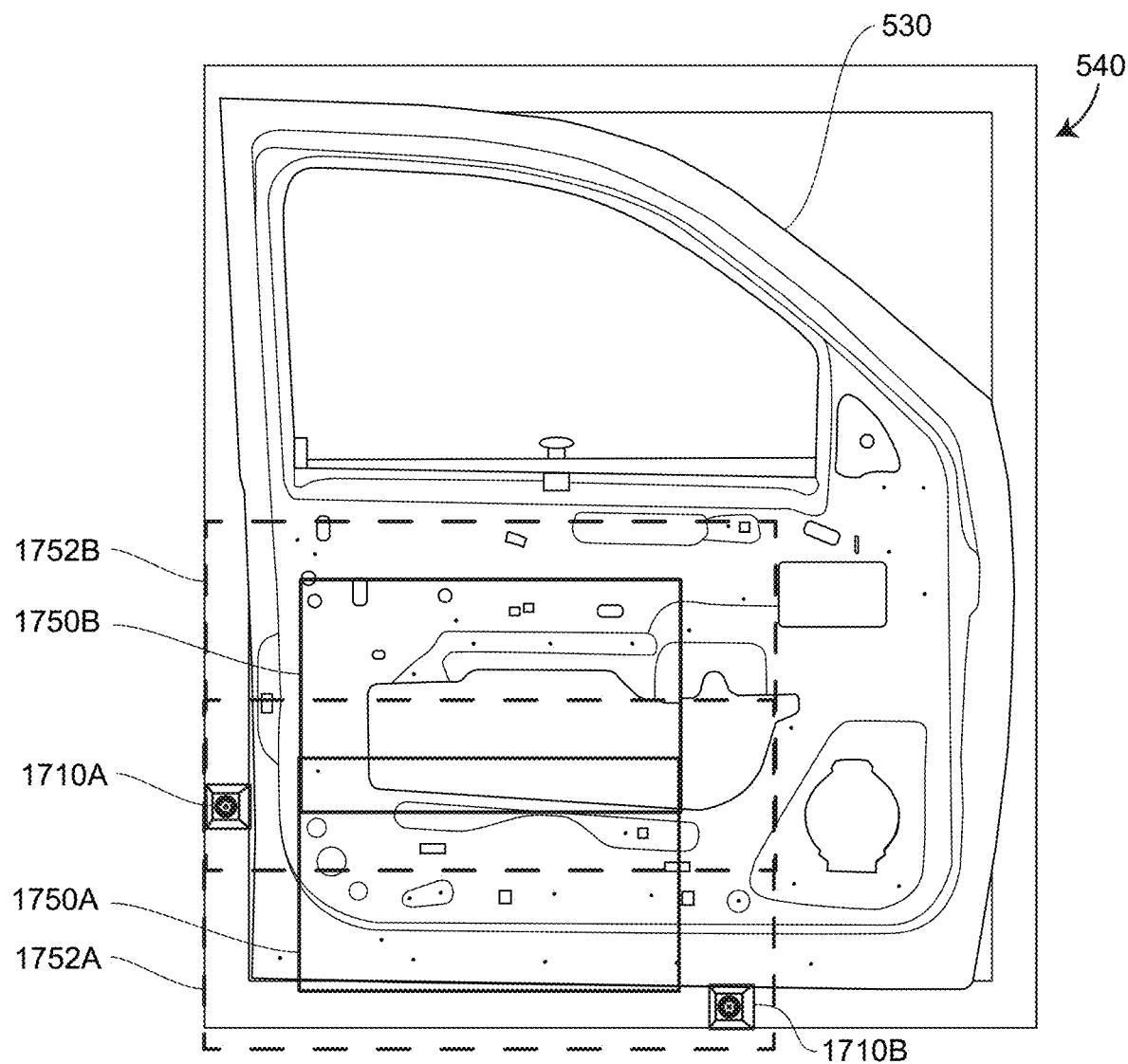
FIGS. 17A, 17B illustrate the use of polarization targets to register 3D coordinates obtained in different scans according to an embodiment.

In FIG. 17A, in a first instance, a triangulation scanner or measuring device 510 (FIG. 5A) obtains 3D coordinates over a region 1750A. Also, in the first instance, a wide-FOV polarization camera 512 coupled to the triangulation scanner or measuring device 510 captures an image of the polarization target 1710A over a region 1752A. In a second instance, the triangulation scanner or measuring device 510 obtains 3D coordinates over a region 1750B, and the polarization camera 512 captures an image of the polarization target 1710A over a region 1752B. Using this information, a processor determines for both the first instance and the second instance the orientation of at least two of the normal vectors of the surfaces of the polarization target 1710A as well as the transverse (side-to-side) position of the polarization target 1710A. In an embodiment, the processor uses this information to register the 3D coordinates of the object 530 over the regions 1750A, 1750B in a common coordinate system. In the first instance, the polarization camera further captures a polarization target 1710B in the region 1752A.

Figure 17B:
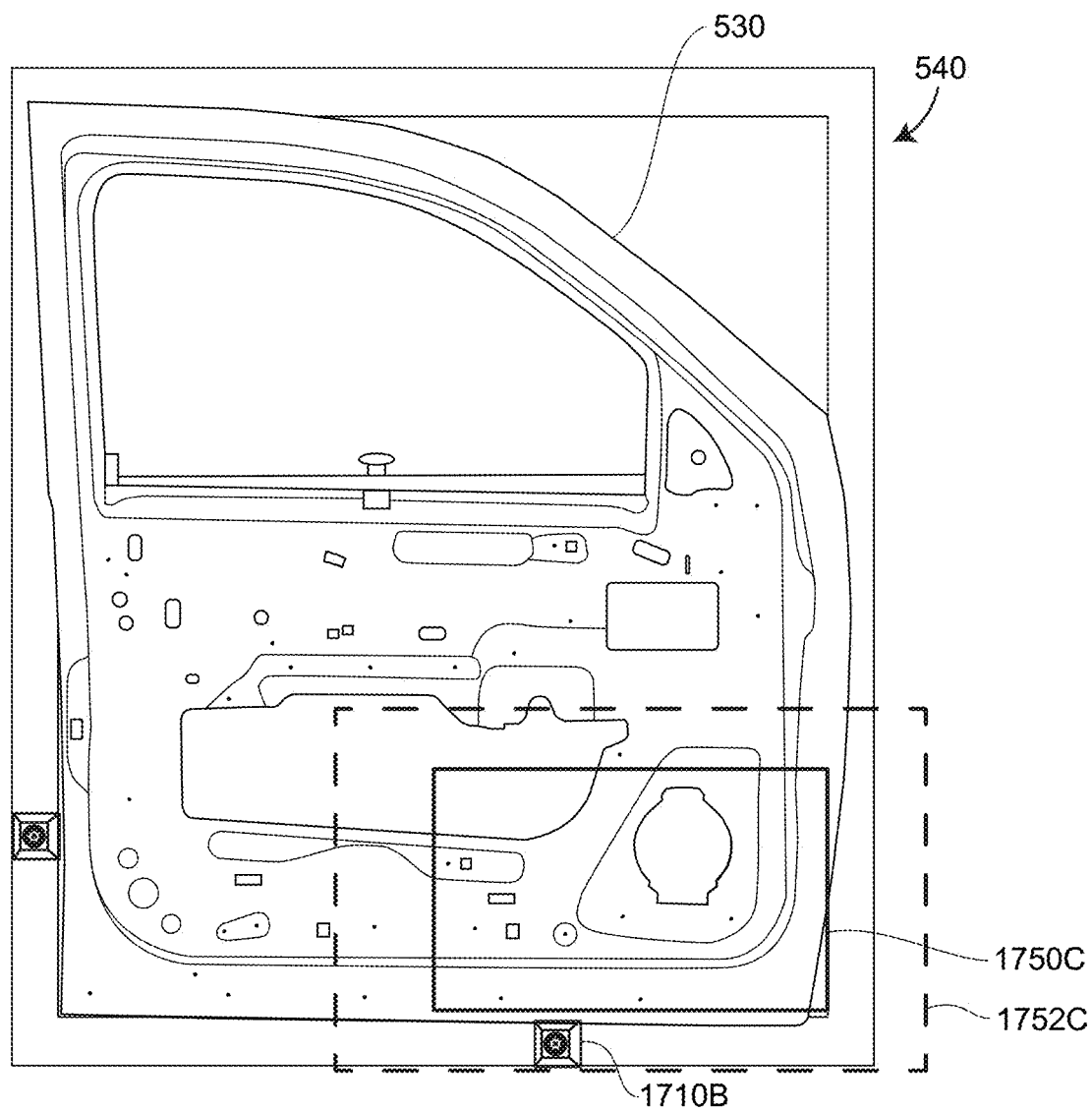

In FIG. 17B, in a third instance, a triangulation scanner or measuring device 510 obtains 3D coordinates over a region 1750C. In an embodiment, at least one camera 512 is a wide-FOV polarization camera coupled to the triangulation scanner or measuring device 510. The polarization target 1710B is captured by the polarization camera 512 in the regions 1752A and 1752C. A processor determines in the first instance and the second instance the orientation of at least two of the normal vectors of the surfaces of the polarization target 1710B as well as the transverse position of the polarization target 1710B. In an embodiment, the processor uses the orientation and position of the target in the regions 1752A, 1752C to register all the 3D coordinates of the object 530 measured by the scanner or measuring device 510. FIGS. 17A, 17B illustrate the ability of a small number of polarization targets to accurately position and orient 3D data points captured over slightly overlapping regions of space. In an embodiment, a transverse position of the polarization target may be determined based at least in part on a plurality of edge segments captured by the polarization camera.

Figure 18:
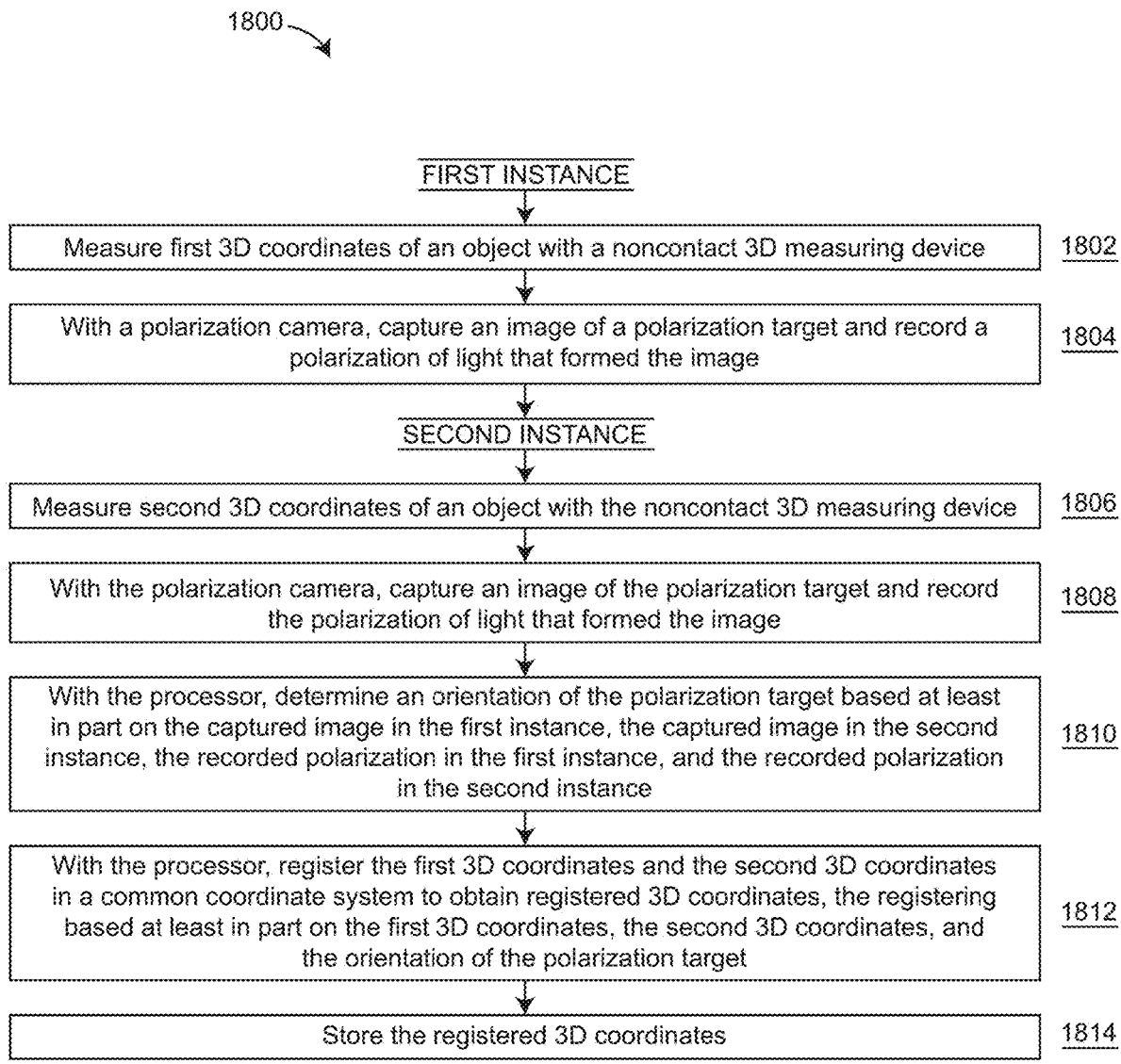
FIG. 18 is a flow chart that describes a method for registering 3D data points according to an embodiment.

FIG. 18 is a flow chart describing a method 1800 according to an embodiment of the present invention. In a first instance, an element 1802 includes measuring first 3D coordinates of an object with a noncontact measuring device. In the first instance, an element 1804 includes, with a polarization camera, capturing an image of a polarization target and recording polarization of light that formed the image. In an embodiment, the noncontact 3D measuring device is a triangulation scanner such as the measuring device or area triangulation scanner 310, 510. In an embodiment, the polarization camera is attached to the triangulation scanner, as a camera 512 is attached to the scanner or measuring device 510. In an embodiment, two cameras 512 are attached to the scanner or measuring device 510. In a second instance, an element 1806 includes measuring second 3D coordinates of an object with the noncontact measuring device. In the second instance, the element 1808 includes, with the polarization camera, capturing an image of a polarization target and recording polarization of light that formed the image.

An element 1810 includes, with the processor, determining an orientation of the polarization target based at least in part on the captured image in the first instance, the captured image in the second instance, the recorded polarization in the first instance, and the recorded polarization in the second instance. An element 1812 includes, with the processor, registering the first 3D coordinates and the second 3D coordinates in a common coordinate system to obtain registered 3D coordinates, the registering based at least in part on the first on the first 3D coordinates, the second 3D coordinates, and the orientation of the polarization target. An element 1814 includes storing the registered 3D coordinates.

Figure 19:
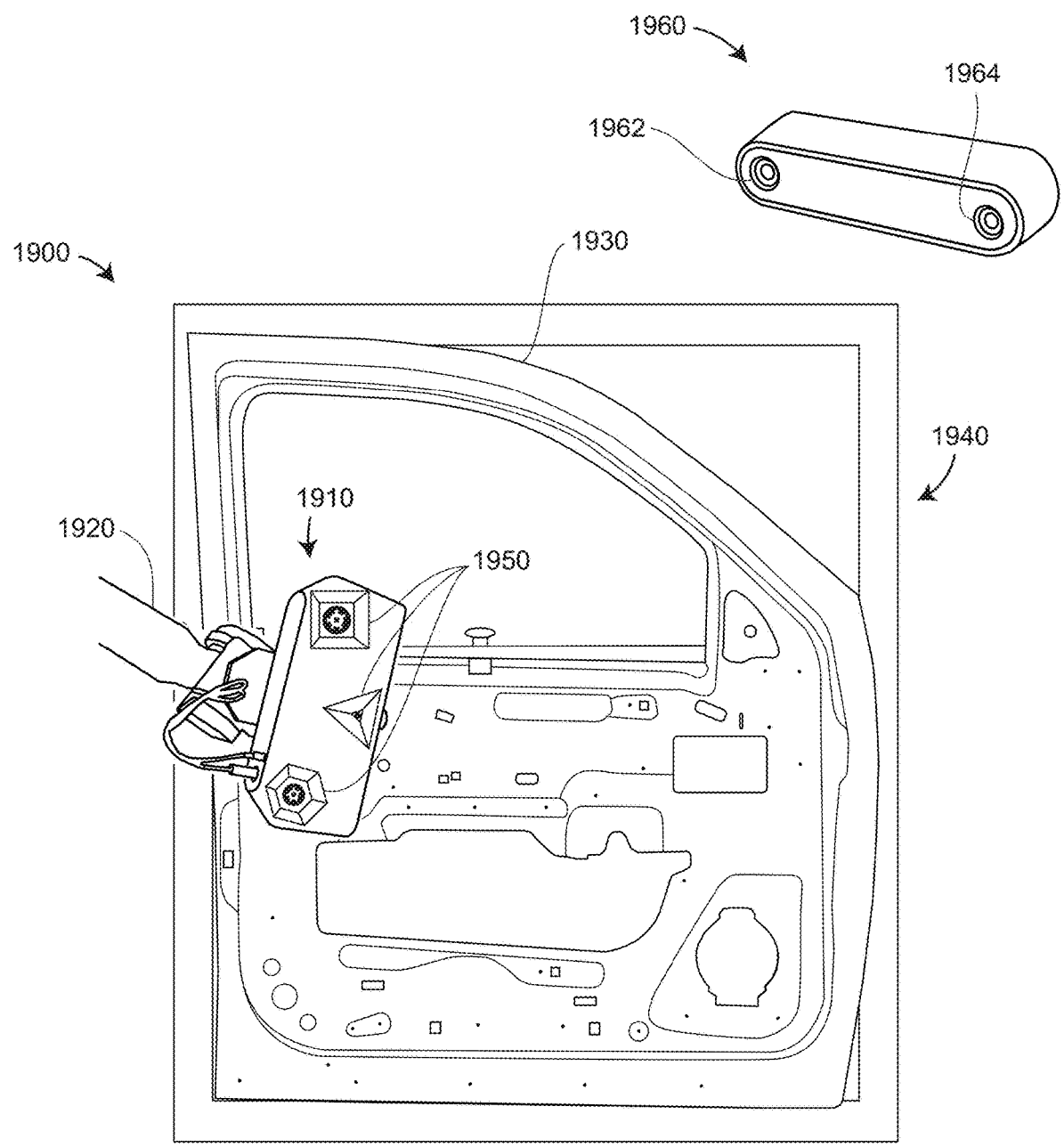
FIG. 19 illustrates a system includes a noncontact 3D measuring device, an object, and a fixture that holds the object in accordance with an embodiment.

In an embodiment illustrated in FIG. 19, a system 1900 includes a noncontact 3D measuring device 1910, an object 1930, and a fixture 1940 that holds the object 1930. In an embodiment, noncontact 3D measuring device 1910 is a triangulation scanner such as the area triangulation scanner 310. In an embodiment, the area triangulation scanner 310 is attached to a robot 1920. In an embodiment, the noncontact 3D measuring device 1910 is coupled to one or more polarization targets 1950, which are measured by one or more polarization cameras such as 1962 or 1964. In an embodiment, a stereo polarization camera 1960 includes a plurality of polarization cameras 1962, 1964. In the example shown in FIG. 19, the object 1930 is a car door. In a 3D measurement method illustrated in FIG. 19, the one or more polarization cameras such as 1962 or 1964 provide a way to register the noncontact 3D measuring device as it moves to multiple positions to measure portions of the object 1930. In this way the one or more polarization cameras 1962. 1964 and the polarization targets 1950 enable a plurality of 3D scan measurements, each covering a smaller FOV, to be stitched together to provide a single registered 3D image. In other words, in this example, the measured 3D points of the object 530 are registered into a common frame of reference. In one simple configuration, a single polarization target 1950 is used with a stereo polarization camera 1960. In another simple configuration, a single polarization camera is used to measure a plurality of polarization targets. Either of these two simple configurations enables the six degree-of-freedom poses (position and orientation) of the noncontact 3D measuring device 1910 to be determined during measurement of the object 1930. Of course, it is also possible to include additional polarization cameras or additional polarization targets to further increase registration accuracy.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not limited by the foregoing description but is only limited by the scope of the appended claims.

What is claimed is:

1. A system comprising:
a polarization target having two or more surfaces and a marker;
a first polarization camera that captures a target image of the polarization target and to record polarization of light that formed the target image; and
a processor that determines an orientation of the polarization target based at least in part on the target image and the orientation of the polarization, and wherein the processor determines a transverse position of the polarization target based at least in part on an image of the marker captured by the first polarization camera.

2. The system of claim 1 wherein the polarization target includes a dielectric material.

3. The system of claim 1 wherein the polarization target includes a non-metallic material.

4. The system of claim 1 wherein the processor further determines a transverse position of the polarization target based at least in part on a plurality of edge segments captured by the first polarization camera.

5. The system of claim 1 wherein the polarization target further includes a second marker.

6. The system of claim 1 wherein the processor further determines the orientation of the polarization target further based on a geometrical representation of the polarization target.

7. The system of claim 6 wherein the processor further determines the orientation of the polarization target based on an optimization program to minimize residual errors in the orientation.

8. The system of claim 1 further comprising a noncontact three-dimensional (3D) measuring device operable to measure 3D coordinates of an object.

9. The system of claim 8 wherein the noncontact 3D measuring device is a triangulation scanner having a projector and a scanner camera, the triangulation scanner operable to measure three-dimensional (3D) coordinates of the object.

10. The system of claim 9 wherein the processor further registers 3D coordinates obtained by the triangulation scanner in a first scan and a second scan based at least in part on a first image and a second image of the polarization target obtained by the first polarization camera.

11. The system of claim 10 wherein the polarization target is coupled to the triangulation scanner.

12. The system of claim 11 further comprising a second polarization target coupled to the triangulation scanner.

13. The system of claim 11 further comprising a second polarization camera, the first polarization camera and the second polarization camera being part of a stereo polarization camera.

14. The system of claim 1 wherein the processor further determines a normal vector of a surface of the polarization target, the normal vector based at least in part on a determined polarization of light that formed an image of the surface.

15. The system of claim 14 wherein the processor further determines the normal vector of the surface of the polarization target based at least in part on a determined angle of polarization of the surface of the polarization target.

16. The system of claim 14 wherein the processor further determines a normal vector of a plurality of surfaces of the polarization target.

17. The system of claim 1 wherein the system further includes a second polarization target.

* * * * *